(12) United States Patent
Erignac

(10) Patent No.: US 11,908,336 B2
(45) Date of Patent: Feb. 20, 2024

(54) SYSTEM AND METHOD FOR CLEARANCE-BASED TAXI ROUTE PLANNING

(71) Applicant: The Boeing Company, Chicago, IL (US)

(72) Inventor: Charles A. Erignac, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 428 days.

(21) Appl. No.: 16/673,832

(22) Filed: Nov. 4, 2019

(65) Prior Publication Data
US 2021/0134167 A1 May 6, 2021

(51) Int. Cl.
| G08G 5/06 | (2006.01) |
| G08G 5/00 | (2006.01) |
| B64C 39/02 | (2023.01) |
| G05D 1/00 | (2006.01) |
| B64U 101/00 | (2023.01) |

(52) U.S. Cl.
CPC .......... *G08G 5/065* (2013.01); *B64C 39/024* (2013.01); *G05D 1/0088* (2013.01); *G08G 5/0069* (2013.01); *B64U 2101/00* (2023.01)

(58) Field of Classification Search
CPC .... G08G 5/065; G08G 5/0069; B64C 39/024; B64C 2201/12; G05D 1/0088
See application file for complete search history.

(56) References Cited

U.S. PATENT DOCUMENTS

| 6,928,363 B2 | 8/2005 | Sankrithi | |
| 10,063,435 B2 | 8/2018 | Bush et al. | |
| 10,290,218 B2* | 5/2019 | Nostry | G08G 5/025 |
| 2004/0059497 A1* | 3/2004 | Sankrithi | G06F 19/00 701/120 |
| 2009/0018713 A1* | 1/2009 | Coulmeau | G08G 5/0013 701/3 |
| 2010/0292871 A1* | 11/2010 | Schultz | G08G 5/045 342/29 |
| 2014/0249736 A1* | 9/2014 | Beda | 701/120 |
| 2015/0339931 A1* | 11/2015 | Yu | G08G 5/006 |
| 2016/0176517 A1* | 6/2016 | Cox | B64F 5/60 244/50 |
| 2016/0284221 A1* | 9/2016 | Hinkle | G08G 5/0034 |
| 2017/0289189 A1 | 10/2017 | Bush et al. | |
| 2019/0086925 A1* | 3/2019 | Fan | |

* cited by examiner

*Primary Examiner* — Shelley Chen
(74) *Attorney, Agent, or Firm* — Kwan & Olynick LLP

(57) ABSTRACT

Systems and methods for autonomous taxi route planning for an aircraft. Clearance communication is received from a ground control station. A planning problem is generated from the clearance communication and sent to a route planner. The route planner receives the planning problem and plans an executable taxi route. Planning the executable taxi route can include generating a complete breadth first search graph from a start pose to a destination, pruning the graph, minimizing the graph, refining the graph, and extracting the shortest path from the graph.

20 Claims, 31 Drawing Sheets

SYSTEM AND METHOD FOR CLEARANCE-BASED TAXI ROUTE PLANNING

TECHNICAL FIELD

The present disclosure relates to aircraft systems, and specifically to taxi route planning for the same.

BACKGROUND

Unmanned aircrafts, or drones, are aircrafts without a human pilot on board. An unmanned aircraft is a component of an unmanned aircraft system (UAS); which includes the unmanned aircraft, a ground-based controller, and a system of communications between the two. The flight of unmanned aircrafts may operate with various degrees of autonomy: either under remote control by a human operator or autonomously by onboard computers.

One flight phase that is commonly under remote control by a human operator is the taxiing on a runway. The operator manually defines taxi routes by clicking waypoints on a digital map. However, as with any flight phase, automating the process would lead to a reduction in operation costs and increases in predictability and efficiency. Thus, there is a need for a system and method for autonomous taxi route planning for unmanned aircraft systems.

SUMMARY

The following presents a simplified summary of the disclosure in order to provide a basic understanding of certain examples of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a system for autonomous taxi route planning for an aircraft, such as an unmanned aircraft. The system comprises a processor and memory. The memory stores instructions to execute a method. The method includes receiving a route planning problem and then autonomously generating an executable taxi route corresponding to the planning problem based on pre-determined criteria.

In some examples, the route planning problem is generated from a clearance command. In some examples, the clearance command includes a destination, a sequence of named places, and optionally, one or more holds at named intersections. In some examples, generating the executable taxi route includes: grounding references included in the clearance command to generate a grounded clearance; generating a route graph by searching a set of all feasible routes based on the grounded clearance between a start pose and the destination included in the clearance command; pruning the route graph by minimizing free space moves; and extracting a shortest path to generate the executable taxi route. In some examples, generating the route graph includes inserting speculative free space moves to connect a start pose and a goal pose or to a taxi network. In some examples, the free space moves are generated using a closed form solution involving only six combinations of straight line and left and right turn movements. In some examples, turn movements include a center of rotation defined by an intersection between an axis of non-steerable wheels and an axis of a steerable wheel. In some examples, grounding references includes generating a set of candidate goal poses for the destination. In some examples, grounding references includes generating a sequence of traversable zones for the sequence of named places. In some examples, the route planning problem includes one or more of the following inputs: a start pose, an abstract destination, an abstract route definition, an airport map, and aircraft kinematic model, and an aircraft footprint. In some examples, the airport map is partitioned into zones, the zones being one of three types: taxiway, runway, and non-movement. In some examples, the airport map includes a taxiway network, the taxiway network including regulation centerlines/guidelines. In some examples, the taxiway network is a graph of centerlines/guidelines and vertices, wherein each vertex represents an entry point into a zone. In some examples, the route graph includes nodes built on top of taxi vertices and poses, edges representing valid movements between states along taxi edges and free space moves, and breadth-first graph expansion. In some examples, the aircraft footprint includes an undercarriage constraint and an aircraft constraint. In some examples, generating the executable taxi route occurs in k+2 stages, wherein k represents the number of places named in the sequence of named places included in the clearance command. In some examples, the executable taxi route includes one or more of the following criteria: a path that a drive-by-wire system can follow accurately, a path that keeps the plane on pavement, and a path that is free of collision with known obstacles. In some examples, the aircraft is an unmanned aircraft. As used herein, the term "path" is used interchangeably with "route."

Another aspect of the present disclosure relates yet to another system. The system comprises a clearance manager configured to generate a planning problem based on a clearance communication. The system also includes a route planner configured to generate a planned taxi route from the planning problem. The route planner includes a plurality of modules, such as a grounding reference module, a route graph generation module, a route graph pruning module, and a shortest path module. The grounding reference module is configured to generate a grounded clearance from the planning problem. The route graph generation module is configured to generate a route graph by searching a set of all feasible routes based on the grounded clearance. The route graph pruning module is configured to prune the route graph by minimizing free space moves. Last, the shortest path extraction module is configured to generate the executable taxi route by extracting a shortest path from the pruned route graph.

Yet another aspect of the present disclosure relates to a method for generating a route graph. The method comprises building the route graph by iterating through k+2 stages, where k represents a number of named places included in a clearance route. A stage comprises a data structure that associates a part of the clearance route with a set of zones and vertices. Iterating through the k+2 stages can include, at a first stage, recursively finding all zones connected to a starting zone associated with a start pose. Next, for each of k stages following the first stage, iterating through the stages includes computing a set of vertices and zones associated with each stage. Iterating through the stages also includes, at a last stage, determining a set of goal poses based on the clearance route.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular examples of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

DETAILED DESCRIPTION

Figure 1:
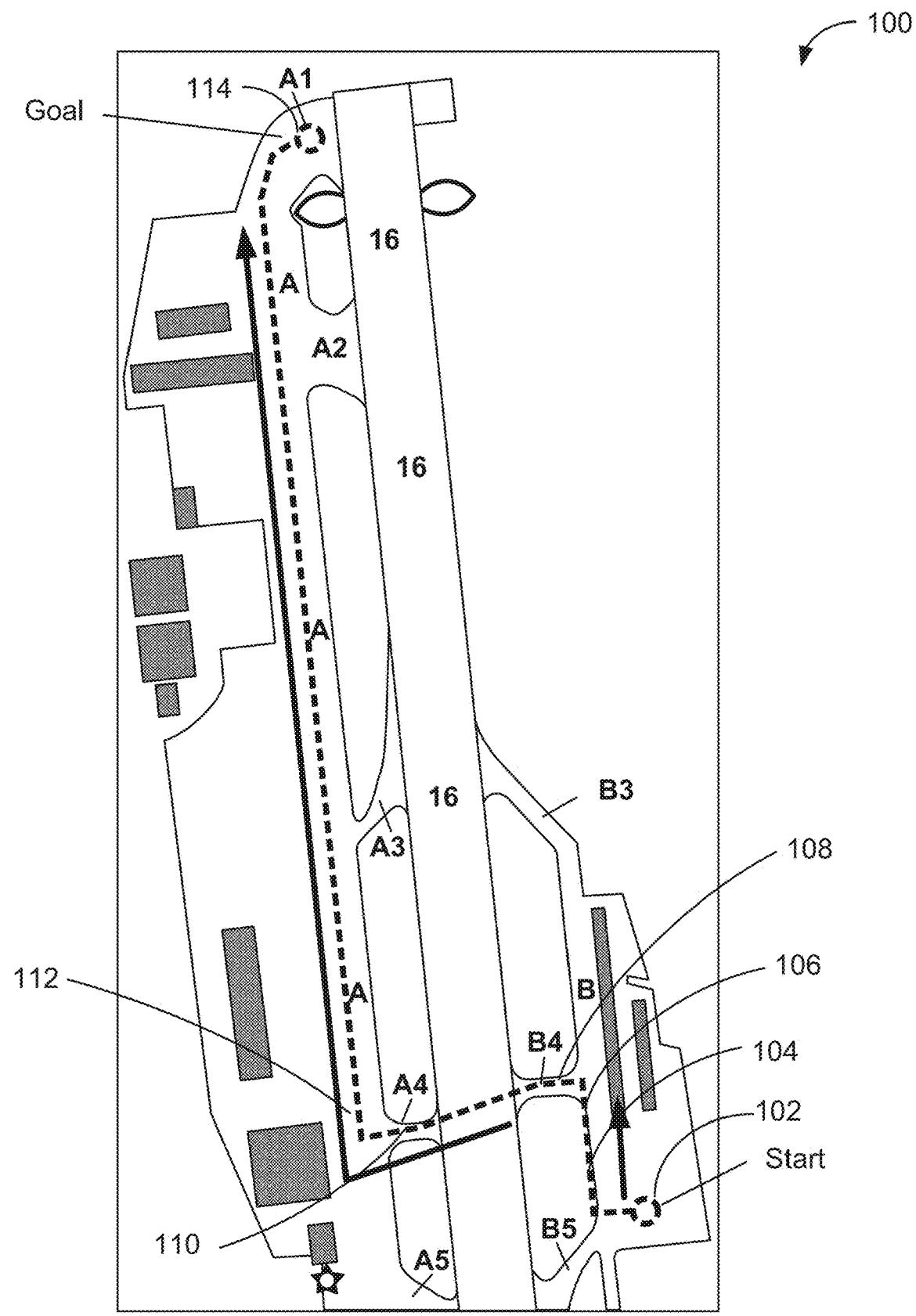
FIG. 1 shows an example of a taxi route, in accordance with examples of the present disclosure.

Reference will now be made in detail to some specific examples of the disclosure including the best modes contemplated by the inventors for carrying out the disclosure. Various examples are illustrated in the accompanying drawings. While the disclosure is described in conjunction with these specific examples, it will be understood that it is not intended to limit the disclosure to the described examples. On the contrary, it is intended to cover alternatives, modifications, and equivalents as may be included within the spirit and scope of the disclosure as defined by the appended claims.

For example, the techniques of the present disclosure will be described in the context of taxi route execution for unmanned aircraft systems. However, it should be noted that the techniques of the present disclosure apply to a wide variety of unmanned vehicle systems, for example, unmanned automobile systems. Further, the techniques of the present disclosure may be applied to manned or piloted aircraft to, for example, offload certain tasks from a human operator. In the following description, numerous specific details are set forth in order to provide a thorough understanding of the present disclosure. Particular examples of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some examples include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As mentioned above, automating different processes of an aircraft can lead to a reduction in operation costs and increases in predictability and efficiency. In various examples, surface movements of aircraft, such as unmanned aircraft (UAs) are performed through Air Traffic Control (ATC) taxi clearances. Currently, UAs utilize static taxi routes that are pre-approved by ATC. However, such routes require an operator to manipulate a series of waypoints and knobs as the UA is taxiing. To address this deficiency, clearances can be obtained by the ground station operator (GSO) and then subsequently relayed to the aircraft through the ground control station (GCS). If the route planning and taxi execution processes are automated, then the operator simply has to relay the clearances, instead of actually manipulating the aircraft through the waypoints. Thus, in some examples, the process begins after receiving a clearance command from ATC.

FIG. 1 shows an example of a taxi route, in accordance with examples of the present disclosure. Taxi Route 100 is simply an example taxi route that corresponds to a clearance command received from ATC. The clearance command corresponding to taxi route 100 may be given as follows: "123A, Runway 16 taxi via Bravo, Bravo 4, Alpha 4, Alpha, Alpha 1, hold short of runway 16 on Bravo 4." This taxi clearance identifies the aircraft (123A), and tells the aircraft to taxi to runway 16 via various taxiways, B, B4, A4, A, and A1. The clearance command also tells the aircraft to hold short of runway 16 while on taxiway B4. After the clearance command is received, it is converted into taxi route 100.

Taxi route 100 depicts a start point 102 where aircraft 123A (not shown) starts. The first taxiway the aircraft hits is B ("Bravo") (104). The aircraft will then turn onto the second taxiway B4 at 106. The aircraft will then hold on the intersection of runway 16 and taxiway B4 (108). The aircraft will just hold there until it receives a clear to cross command from ATC. Then the aircraft will cross runway 16 and enter taxiway A4 (110). Once the aircraft reaches taxiway A (112), then it will travel unimpeded until it reaches A1, and then the goal (114) just short of runway 16.

In order to automate the taxi route execution, certain rules of the road need to be followed. First, an aircraft communicates with ATC via Very High Frequency (VHF) on ground frequency. Movement areas are parts of an airport surface where movements are controlled by ATC. These are typically runways and taxiways. Each aircraft needs an initial taxi clearance to enter a movement area on its way to a destination. For example, in the example depicted in FIG. 1, an initial taxi clearance from ATC was needed to enter taxiway B. A taxi clearance defines an abstract route that needs to be interpreted by the pilot/operator with an airport diagram. An aircraft is required to hold at every runway intersection. For example, aircraft 123A was required to hold at the intersection of runway 16 while on taxiway B4. In some examples, a taxi clearance must include, either explicitly or implicitly, "hold" clearances for all runways along the cleared route. Last, an aircraft that is holding needs a "cross" clearance to cross a runway.

Figure 2:
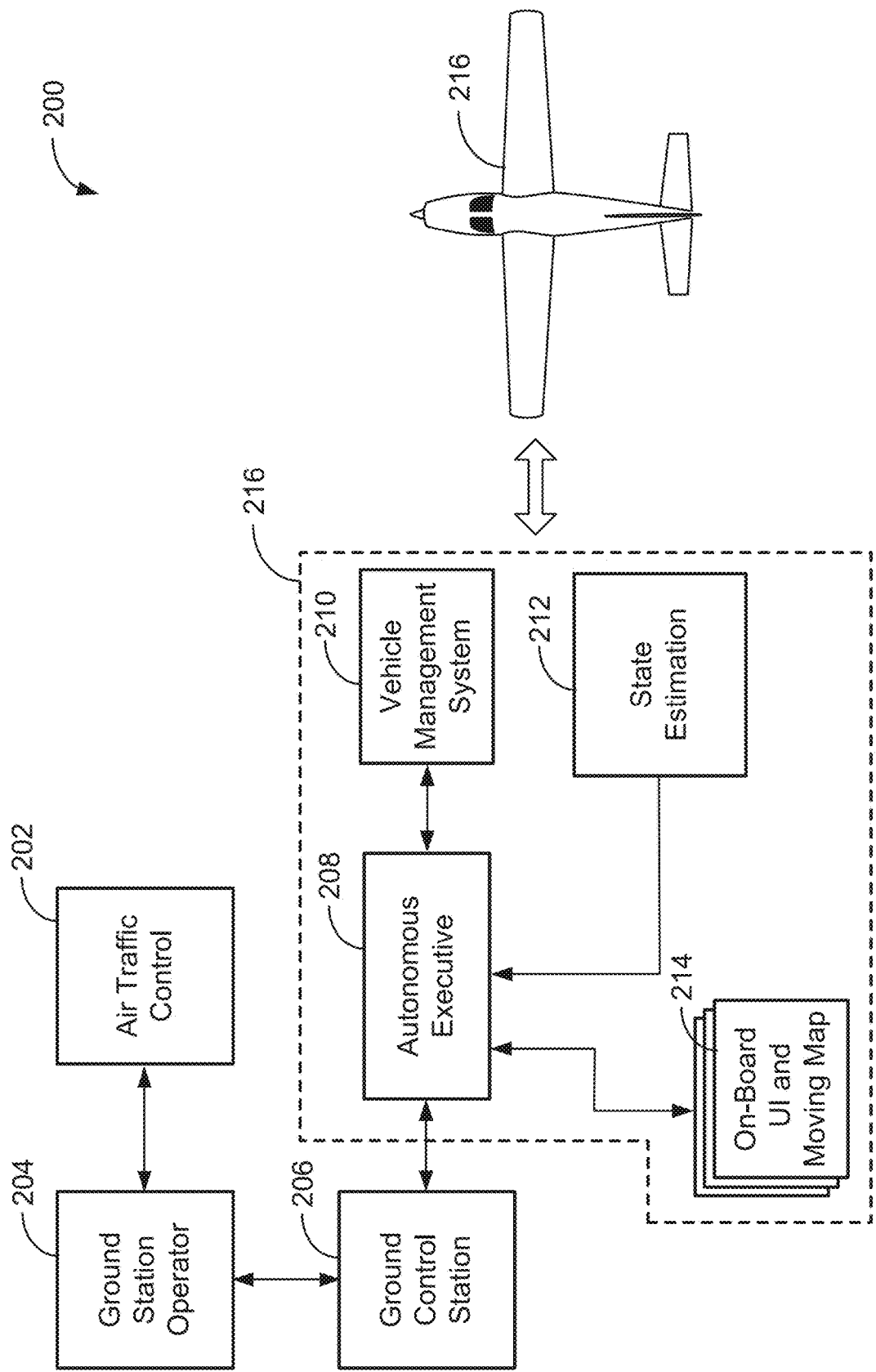
FIG. 2 illustrates a block diagram of an example aircraft, such as an unmanned aircraft system (UAS), in accordance with examples of the present disclosure.

FIG. 2 illustrates a block diagram of an example unmanned aircraft system (UAS), in accordance with examples of the present disclosure. UAS 200 includes ATC 202 that provides the clearances. ATC 202 provides clearance to GSO 204. As mentioned above, the clearances are given in audio format. GSO 204 then transcribes the ATC clearances into GCS 206. GCS 206 transmits the transcribed clearances to autonomous executive (AE) module 208. AE module 208 transforms the clearances into a planned taxi route, along with data objects or data structures that can then be digested by processes to execute the planned taxi route utilizing state estimation module 212. In some examples, state estimation module 212 gives the location of aircraft 216 using GPS.

In some examples, AE module 208 then sends certain messages to vehicle management system (VMS) 210. VMS 210 is responsible for the actual movements of the aircraft. In some examples, VMS 210 is a drive-by-wire system that controls the movement of the aircraft along an input ground path. In some examples, the path is a sequence of waypoints. In some examples, a waypoint comprises 1) a position on an airport surface, typically encoded as latitude and longitude, 2) a heading (or direction that the aircraft is pointed), and 3) a ground speed. In some examples, the waypoint speeds along the path are scheduled or predetermined. In some examples, the waypoint speed schedule is determined by minimizing transit time and observing vehicle dynamic limitations. Further, the last waypoint along the path commands zero speed.

In some examples, AE module 208 also sends the planned taxi route to on-board UI and moving map 214. In some examples, on-board UI and moving map 214 is presented as a graphical user interface (GUI). In some examples, UI and moving map 214 can be helpful for testing purposes by simulating a GCS, and thus may be optional in UAS 200. In some examples, AE module 208, VMS 210, state estimation 212, and on-board UI and moving map 214 are located on an aircraft 216.

Figure 3:
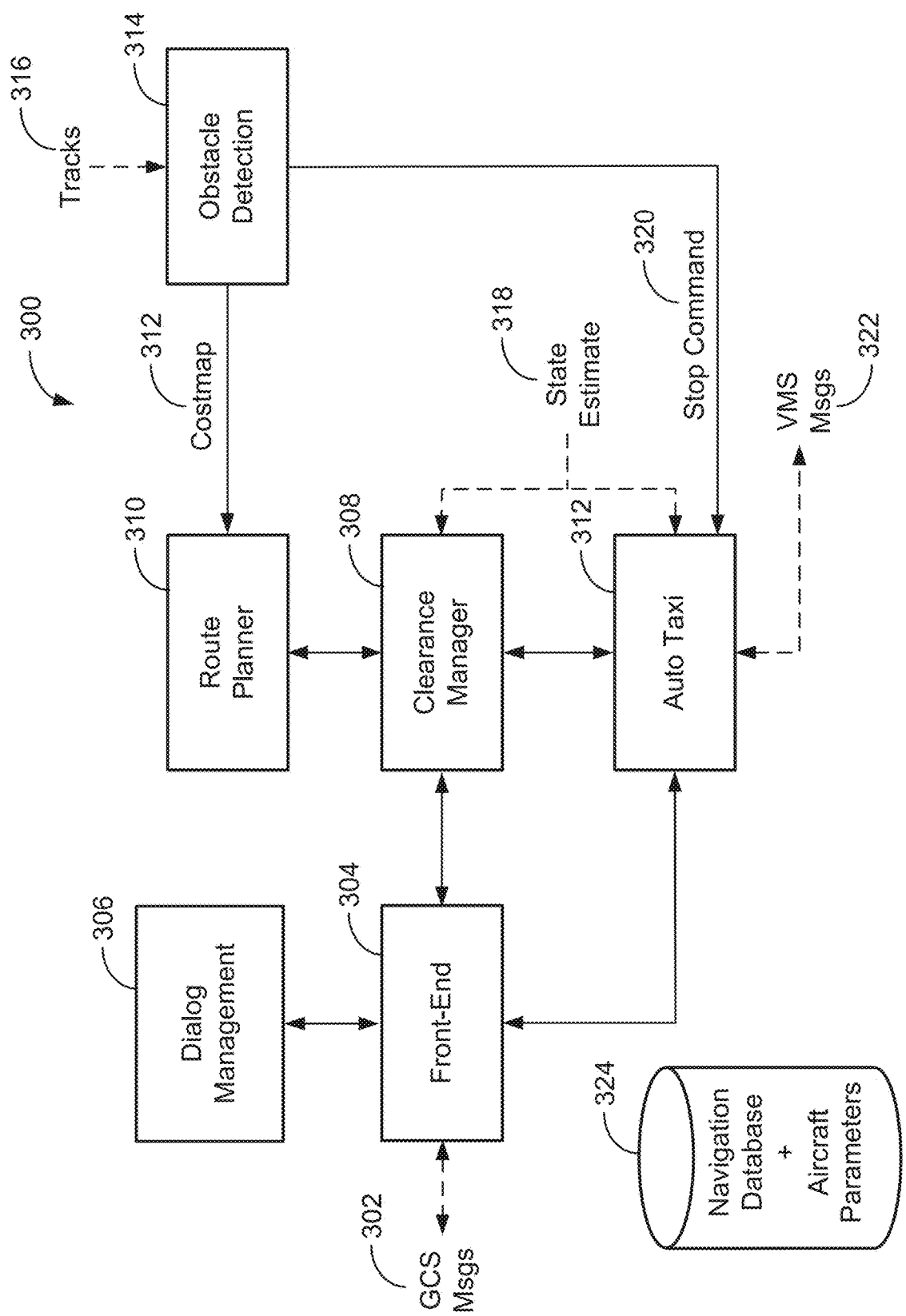
FIG. 3 illustrates a block diagram of functional components of an example autonomous executive module, in accordance with examples of the present disclosure.
Figure 4:
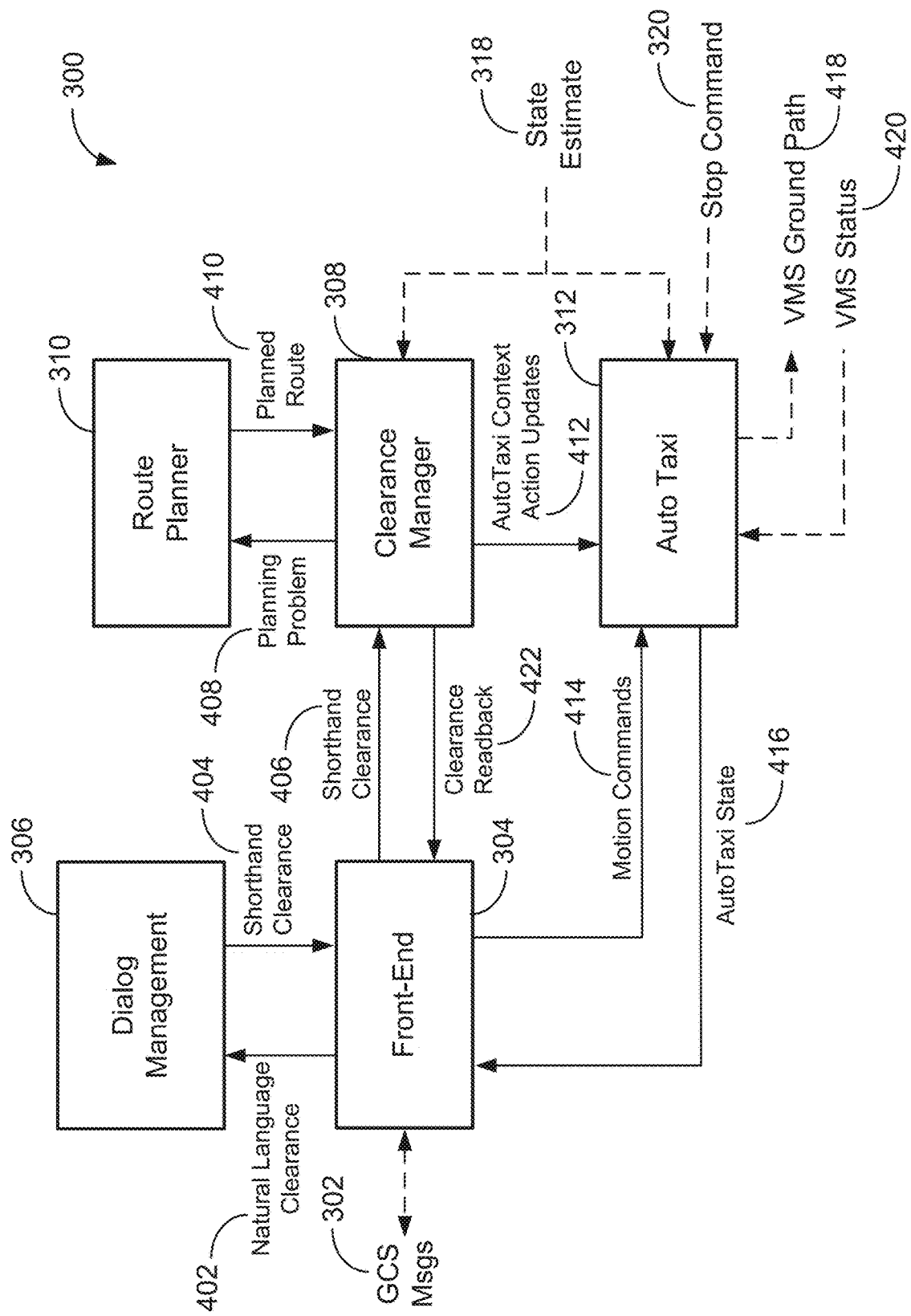
FIG. 4 shows an example of internal message flow in an example autonomous executive module, in accordance with examples of the present disclosure.

FIGS. 3 and 4 illustrate the inner workings of an example autonomous executive module, in accordance with examples of the present disclosure. FIG. 3 illustrates a block diagram of functional components of an AE module, and FIG. 4 shows an example of internal message flow in an AE module.

In some examples, autonomous executive module 300 is responsible converting an ATC clearance into a usable data object. A GCS message 302 is first received at front-end module 304. Front-end module 304 is responsible for sending GCS message 302 to dialog management module 306 in natural language form 402. In some examples, dialog management module 306 translates ATC clearances, such as GCS message 302, copied verbatim by the GSO into a command-level semantic representation. In addition, in some examples, dialog management module 306 validates that the clearance is intended for the aircraft. In some examples, dialog management module 306 also grounds referents to physical objects, e.g. runways, taxiways, etc. In some examples, dialog management module 306 can also output a confidence metric on the interpretation. Once dialog management module 306 sends back the GCS message 302 in a semantic representation, or "shorthand" form, front end module 304 interprets GCS message 302.

In some examples, the GCS will send three different types of commands: 1) clearance commands, 2) movement commands, and 3) housekeeping commands. In some examples, clearance commands include "taxi," "exit," "hold," and "cross." In some examples, these commands can be interpreted as "scheduled" commands for the aircraft to follow. In some examples, front-end module 304 sends clearance commands to clearance manager 308. In some examples, movement commands include "exec," "stop," "halt," and "resume." In some examples, movement commands can be interpreted as "unscheduled" commands for the aircraft to follow. In some examples, front-end module 304 sends movement commands directly to auto taxi module 312. In some examples, housekeeping commands include "init," "reset," and "shutdown." In some examples, housekeeping commands are performed by front-end module 304.

In some examples, front-end module 304 forwards shorthand clearance commands 406 to clearance manager 308. In some examples, clearance manager 308 takes clearance commands 406, sends back a clearance readback 422 to front-end 304, and creates an AutoTaxiContext data structure 412. In some examples, clearance manager 308 maintains a working set of ATC clearances received from GCS. In some examples, the working set includes movement clearances, e.g., "taxi" (format: taxi destination via route) and "exit" (format: exit destination), as well as taxi limits, e.g., "hold" (format: hold taxiway/runway [on taxiway runway]) and "cross" (format: hold taxiway/runway [on taxiway/runway]) from GCS. In some examples, the working set is initialized with receipt of an initial movement clearance. When the initial movement clearance is received, clearance manager 308 validates the clearance and sends a planning problem 408, using state estimate 318 received from state estimation module 212, to route planner 310.

In some examples, planning problem 408 includes a route definition data structure. In some examples, the route definition data structure includes a current location (given by state estimate 318), a destination by name, and a route defined as a sequence of taxiways listed in the clearance. Route planner 310 takes planning problem 408 and returns a planned route 410 using costmap 312 received from obstacle detection module 314. In some examples, object detection module 314 processes sensor inputs, fused together in the form of "tracks" 316, of the aircraft for detecting obstacles. It sends costmap 312, which is a distance field that indicates the distance to dynamic obstacles that are not already part of a static environment (e.g., not already listed as an obstacle in an airport map). In some examples, object detection module 314 can also issue stop command 320 to Auto Taxi module 312, if, for example, it detects a new obstacle along the path. Planned route 410, which is a data structure itself, is then used by clearance manager 308 to construct an AutoTaxiContext data structure 412.

According to various examples, AutoTaxiContext data structure 412 is an overarching data structure that contains all the data necessary for executing planned route 410. In some examples, it contains planned route 410, as well as objects that represent all the information in GCS message 302. AutoTaxiContext datastructures will be further explained with more detail in FIGS. 7 and 8. Once AutoTaxiContext data structure 412 is created, it is sent to Auto Taxi module 312 for planned route execution. Auto Taxi module 312 uses the AutoTaxiContext data structure 412 and controls the movement of the aircraft by sending VMS messages 322 to VMS 210. In some examples, a VMS message 322 can take the form of a VMS ground path 418, which is a series of waypoints. Auto Taxi module 312 monitors the motion of the aircraft using state estimate 318 and VMS status 420, received from VMS 210. In some examples, Auto Taxi module 312 also sends a status message in the form of Auto Taxi State 416 to front-end 304 to be translated and relayed back to GCS 206.

As previously mentioned, front-end module sends motion commands 414 directly to auto taxi module 312. These motion commands are "unscheduled" and can actually override "scheduled" command movement caused by clearance commands.

According to various examples, each module listed in autonomous executive module 300 has access to navigation database and aircraft parameters 324. The navigation database includes maps, such as airport maps, that allow autonomous executive 300 to plan the route and execute the same. Navigation database 324 can also be used in conjunction with state estimate 318 to automatically select an active airport map, based on the aircraft's location. Aircraft parameters are also necessary for planning the route and for executing the route because they define the limits of the aircraft movements, including the speed, turning radius, breaking distance, and the size of the aircraft.

Figure 5:
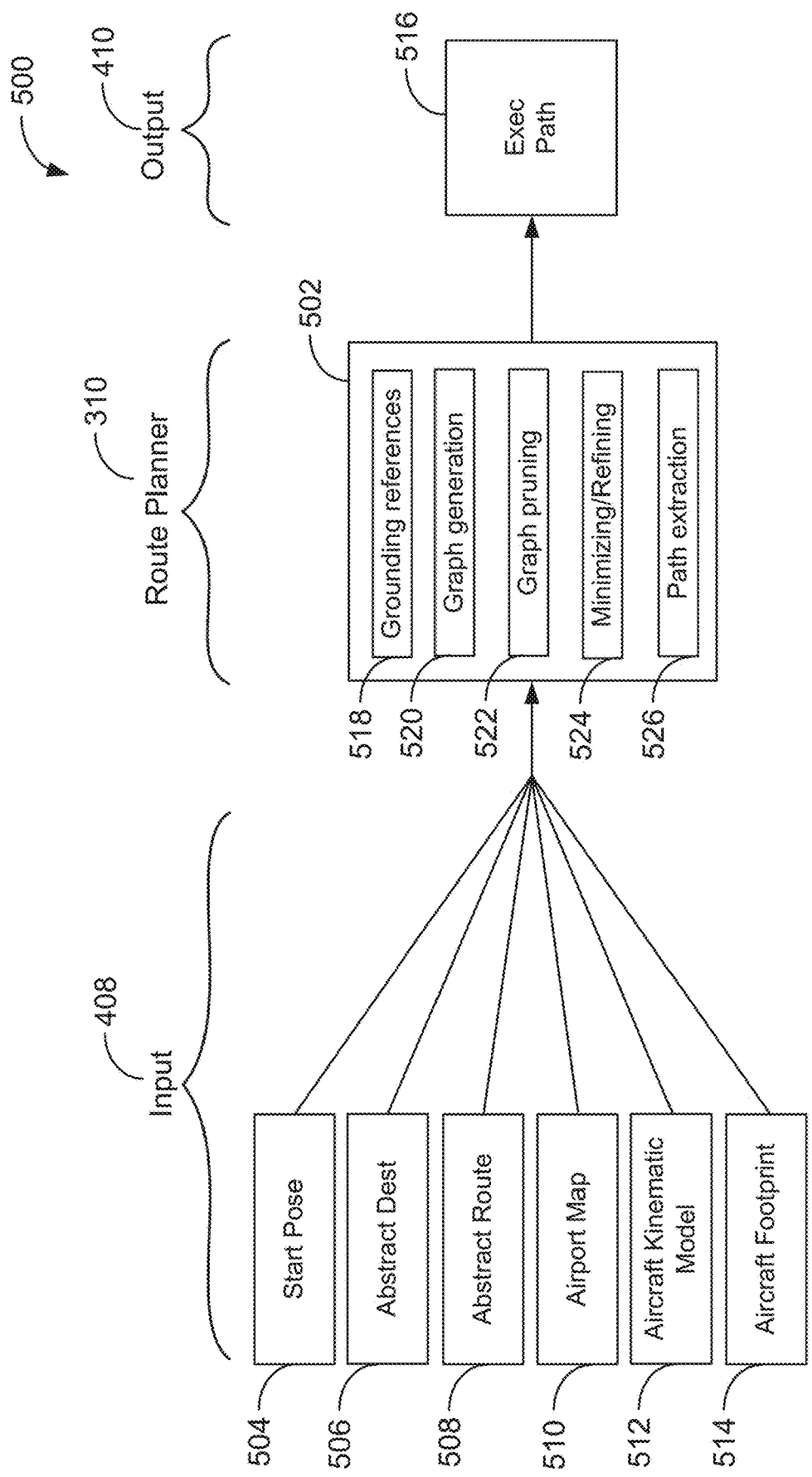
FIG. 5 shows a block diagram of an example route planner, in accordance with examples of the present disclosure.

FIG. 5 shows a block diagram of an example route planner, in accordance with examples of the present disclosure. Diagram 500 depicts route planner 310, which includes planning module 502, taking planning problem 408 as input and outputting planned route 410. In some examples, planning problem 408 includes a plurality of inputs including start pose 504, abstract destination 506, abstract route definition 508, airport map 510, aircraft kinematic model 512, and aircraft footprint 514. A pose is a physical location, usually given as latitude/longitude, plus a heading, or direction. Start pose 504 gives the pose at the time the clearance is received. In some examples, start pose 504 is derived from state estimate 318. Abstract destination 506 is a named place or pose given in the clearance. Usually, destination 506 is a runway or named destination pose. In some examples, destination 506 can be a pose that is manually defined by the GCO, either by entering a latitude/longitude for the destination, or by clicking a waypoint. In the clearance example given above, destination 506 is runway 16. Abstract route definition 508 includes a sequence of named places given in the clearance. In the clearance example given above, route definition 508 includes taxiways B, B4, A4, and A. Airport map 510 is an executable map that allows route planner 310 to ground the abstract references given in the clearance and build a search graph based on the same. An example of airport map 510 is given in FIG. 6. Aircraft kinematic model 512 and aircraft footprint 514 are specification parameters inherent to the aircraft that factor into route planning. These parameters are stored in a separate file or database, or are hardcoded into the system, and are accessible by route planner 310. More detailed examples of aircraft kinematic model 512 and aircraft footprint 514 are described below with reference to FIGS. 7 and 8A-8B, respectively.

As shown in FIG. 5, route planner 310 takes inputs 408 and generates output 410. In some examples, output 410 includes an executable path 516. In some examples, executable path 516 is a series of waypoints, organized into a set of legs. In some examples, planning module 502 also includes sub-modules for solving sub-problems associated with planning problem 408. Sub-modules are modules within route planner 310 that handle specific steps in generating planned route 410. For example, grounding references module 518 is responsible for grounding named places in an abstract clearance to actual real-life locations on an airport map. Graph generation module 520 is responsible for generating a complete breadth-first search graph based on the grounded clearance. Graph pruning module 522 is responsible for pruning the complete search graph. Minimizing/Refining module 524 is responsible for minimizing free space moves in the graph and refining putative moves as necessary. Last, path extraction module 526 is responsible for extracting the shortest path from the pruned, minimized, and refined graph, resulting in executable path 516.

Figure 6:
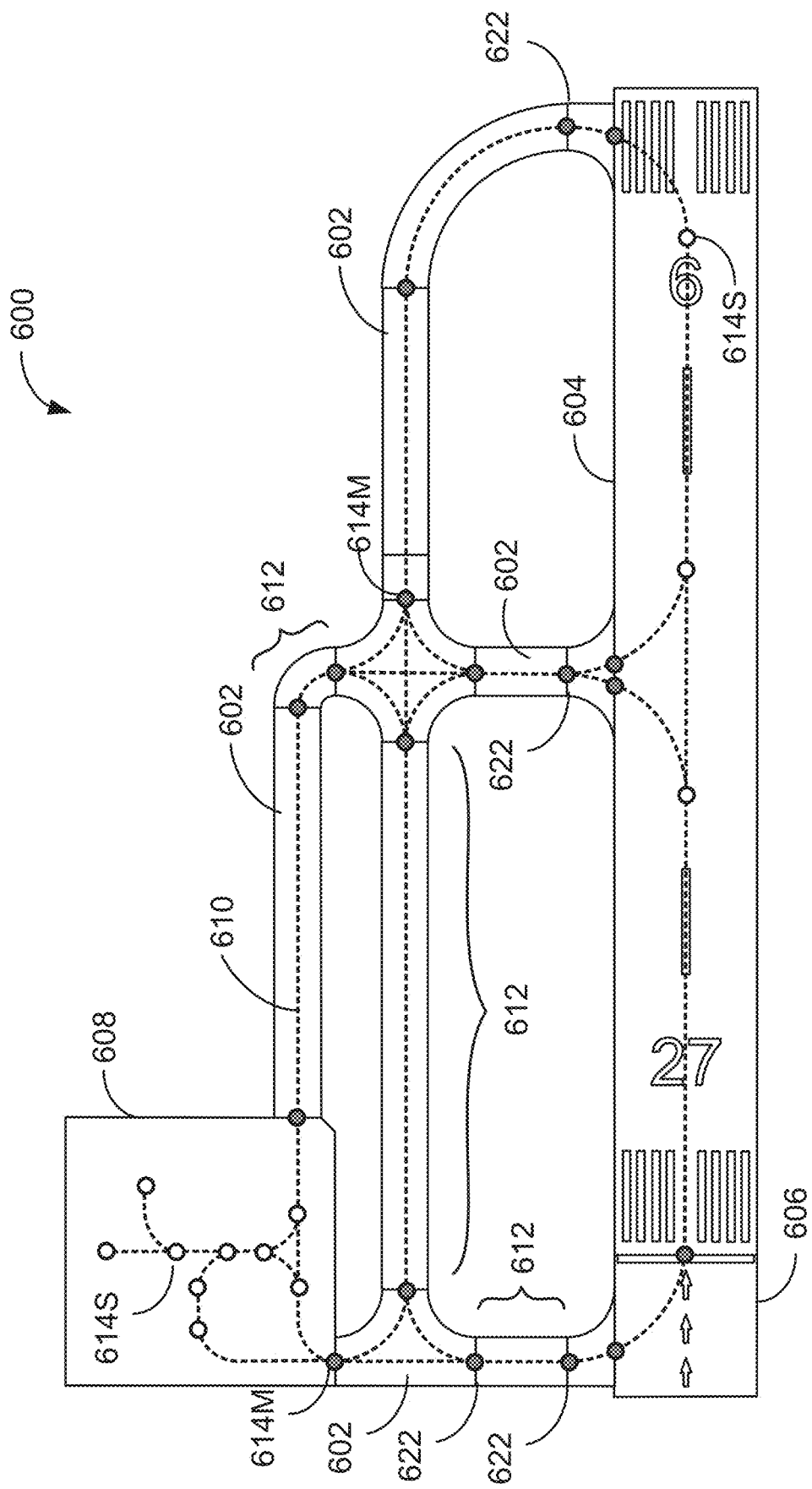
FIG. 6 shows one example of a navigation database or airport map, in accordance with examples of the present disclosure.

FIG. 6 shows one example of a navigation database or airport map, in accordance with examples of the present disclosure. Airport map 600 is a partial depiction of airport map 510 and is divided into traversable surfaces, centerlines/guidelines, non-traversable zones and points, and named poses. Traversable surfaces are surfaces in an airport on which aircrafts can legally travel. Traversable surfaces include taxiways, runways, and "non-movement" or parking areas. In some examples, traversable surfaces are partitioned into "zones." A zone is a 2 dimensional polygon of a piece of pavement that defines where an aircraft can be. An aircraft is allowed to physically be anywhere in a defined zone. Airport map 600 illustrates an example of some zones 612, demarcated by zone boundaries 622. It should be noted that the labeled zones 612 depict only a portion of the zones shown on airport map 600. Virtually any section of a traversable surface belongs to a zone.

Non-traversable zones and points are areas in an airport on which aircrafts are not allowed to travel. In some examples, non-traversable zones include buildings or grassy areas. For the purposes of this disclosure, traversability is a binary function. In other words, a zone is either traversable or it is not. In some examples, the union of all zones correspond to the actual shape of an airport. Airport map 600 includes, as an example, the following traversable zones: taxiways 602, runway 604, displaced threshold zone 606, and ramp 608. Taxiways and runways are both traversable surfaces for taxiing, but with regulatory distinctions. Runways can be used for take-off and landing, but taxiways cannot. In addition, runways can be destinations for a clearance, but taxiways cannot.

In some examples, zones can be categorized into different types. Taxiways include straight and/or curved segments, as well as intersections. Runways include straight segments, intersections, displaced thresholds, and overruns. Airport map 600 includes a displaced threshold zone 606. A displaced threshold zone is a part of a runway that can be used for take-off, but cannot be used for landing, usually because a minimum amount of vertical clearance space is needed to safely clear a nearby building or obstacle. An overrun (not shown) is an extension of a runway used for landings in case extra room is needed to stop safely. It is for emergency use only. Ramp 608 is an example of a "non-movement" traversable zone. In some examples, ramp 608 includes a "stand," or a predefined parking space. A "stand" is a named pose because it defines a location with a specified heading.

Taxiways 602 also include centerlines/guidelines 610. As used herein, the term "centerline" is used interchangeably with "guideline." In some examples, centerlines 610 are painted lines on the airport ground that define the international standard for "preferred" lines to follow during taxiing. For runways, any aircraft of any size that is allowed to be in the airport can move along centerlines freely without worrying about crashing into vertical obstacles. Taxiways have different class sizes based on their width. For some taxiways, large aircrafts cannot taxi on them due to their narrow class. The union of centerlines at an airport form a taxi, or taxiway, network. As used herein, "taxi network" is used interchangeably with "taxiway network." Any movement that is not along the taxi network is defined as a "free space move." Free space moves do not follow guidelines. An important concept in developing autonomous vehicles is the notion of predictability. The more predictable the behavior of an autonomous vehicle, the better. Thus, routes that utilize the taxiway network more are preferred over routes that use it less. In some examples, maximizing taxi network usage may not result in the actual "shortest" path. However, since maximizing predictability is also important, executable path 516 can sometimes be referred to as the "shortest, most predictable path," or the "shortest path that minimizes free space moves."

Airport map 600 also includes a plurality of vertices 614S and 614M. Vertices 614S are single zone vertices located within a single zone. Vertices 614M are multi-zone vertices located on the border between multiple zones. In some examples, multi-zone vertices 614M define entry points into a zone from a different zone along the taxi network. In airport map 600, ramp 608 has multiple single vertices 614S representing points in free space.

Figure 7:
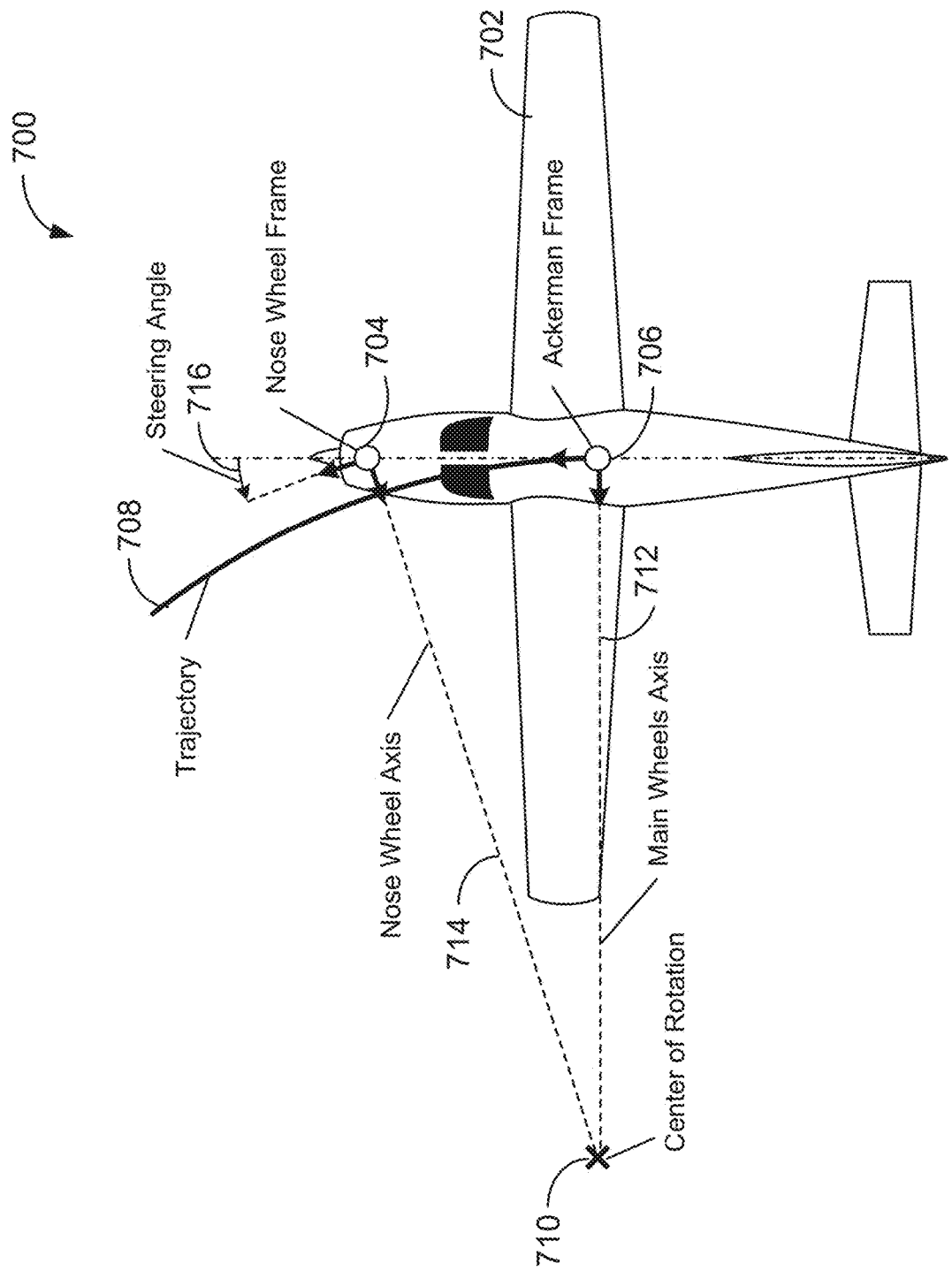
FIG. 7 shows one example of an aircraft kinematic model, in accordance with examples of the present disclosure.

FIG. 7 shows one example of an aircraft kinematic model, in accordance with examples of the present disclosure. Aircraft kinematic model 700 gives the system parameters for how the aircraft 702 moves. In some examples, aircraft kinematic model is the Ackerman motion model. In other examples, kinematic model 700 is another motion model. Aircraft kinematic model 700 describes the trajectory that the aircraft can follow. Model 700 shows a steerable, or "nose," wheel 704 and non-steerable, or "main," wheels 706. The trajectory 708 of a turn movement with a minimum turn radius for aircraft 702 has a center of rotation 710 defined by the point where the axis of the main wheels 712 intersects the axis of the nose wheel 714. Thus, both the nose wheel axis 714 and the main wheel axis 712 point towards the center of rotation 710 during a turn. It should be noted that the turn radius for trajectory 708 can be derived from the steering angle 716 using the formula: wheelbase/tan(steering angle), where the wheelbase is the distance between the nose wheel axel and the main wheel axel.

Figure 8A:
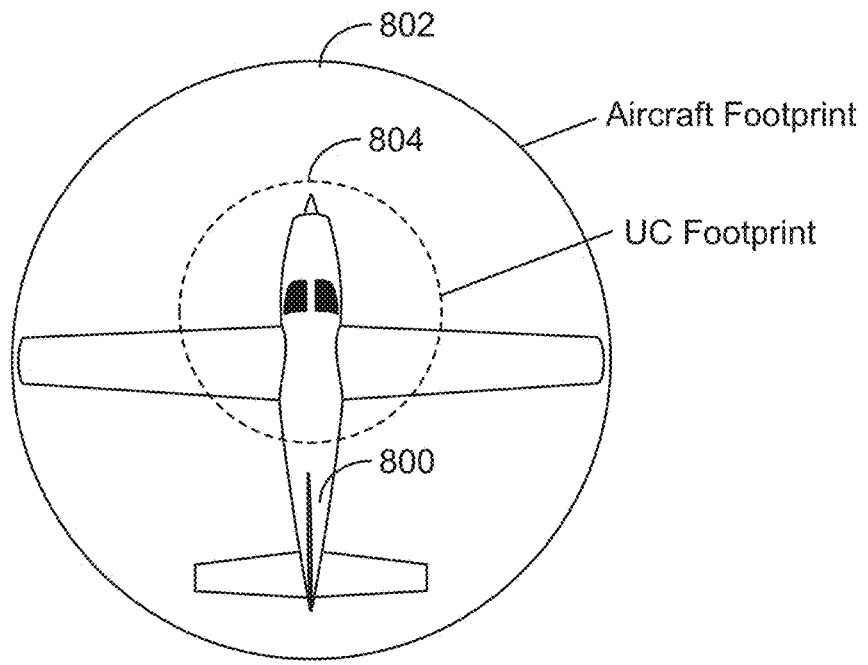
FIG. 8A shows examples of aircraft and undercarriage (UC) footprints, in accordance with examples of the present disclosure.

As with the kinematic model, aircraft footprints and clearances include information pertinent to aircraft movement. FIG. 8A shows examples of aircraft and undercarriage (UC) footprints, in accordance with examples of the present disclosure. FIG. 8A shows aircraft footprint 802 and UC footprint 804 for aircraft 800. Aircraft footprint 802 is represented as a circle corresponding to how much space aircraft 800 needs on pavement to avoid obstacles. UC footprint 804 is represented as a smaller circle corresponding to how much space the undercarriage needs to avoid obstacles.

Figure 8B:
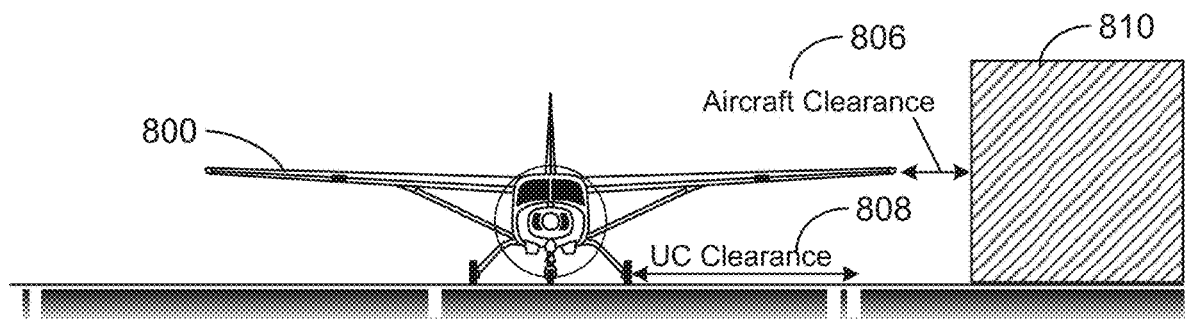
FIG. 8B shows examples of aircraft and undercarriage (UC) clearances, in accordance with examples of the present disclosure.

FIG. 8B shows examples of aircraft and undercarriage (UC) clearances, in accordance with examples of the present disclosure. FIG. 8B shows aircraft clearance 806 represents the minimum amount of free space needed for the wings of aircraft 800 to avoid hitting obstacle 810. UC clearance 808 represents the minimum amount of free space between the undercarriage and the edge of a pavement.

Figure 9:
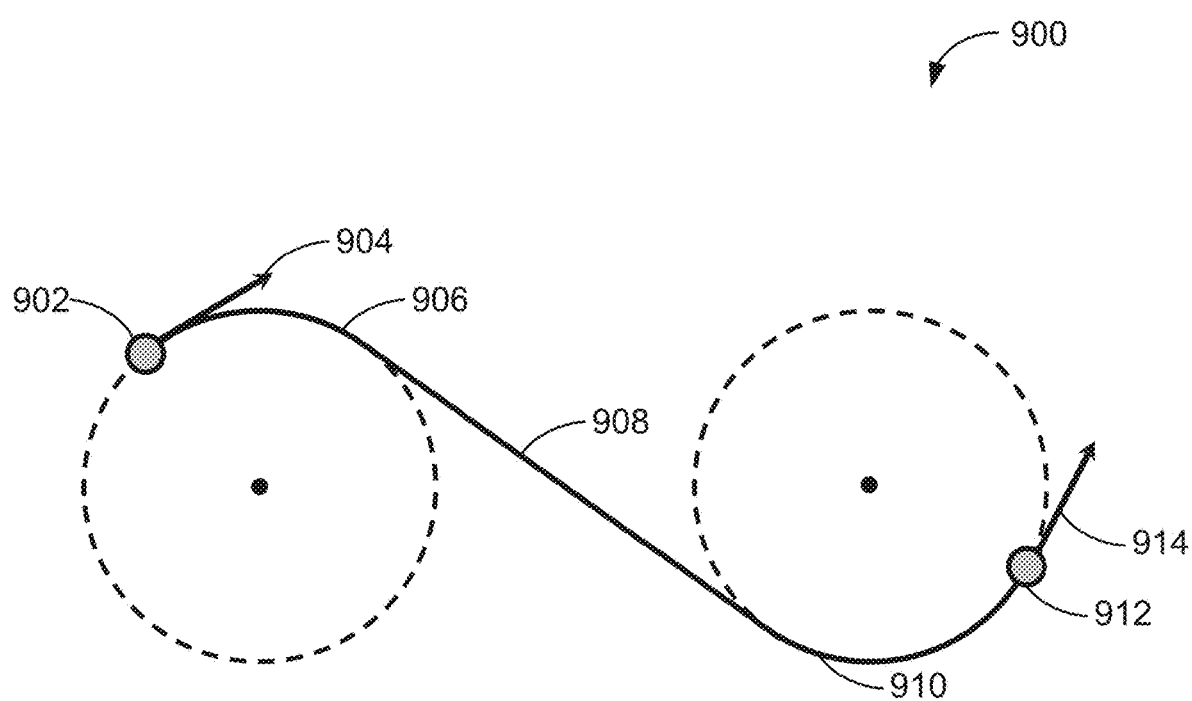
FIG. 9 shows an example of a Dubins Path, in accordance with examples of the present disclosure.

With the aircraft kinematic model, footprints, and clearances, route planner 310 can calculate free space movement using a closed form solution for the optimal path between two poses with a fixed turn radius. One such solution is the Dubins Path. FIG. 9 shows an example of a Dubins Path, in accordance with examples of the present disclosure. Path 900 starts at starting pose 902, with heading 904, and ends at destination pose 912, with heading 914. Path 900 includes a combination of right turn segment 904, straight line segment 906, and left turn segment 908. It should be noted that there are only six combinations of moves between starting pose 902 and destination pose 912: (right, straight, right), (right, straight, left), (left, straight, right), (left, straight, left), (right, left, right), and (left, right, left).

Figure 10:
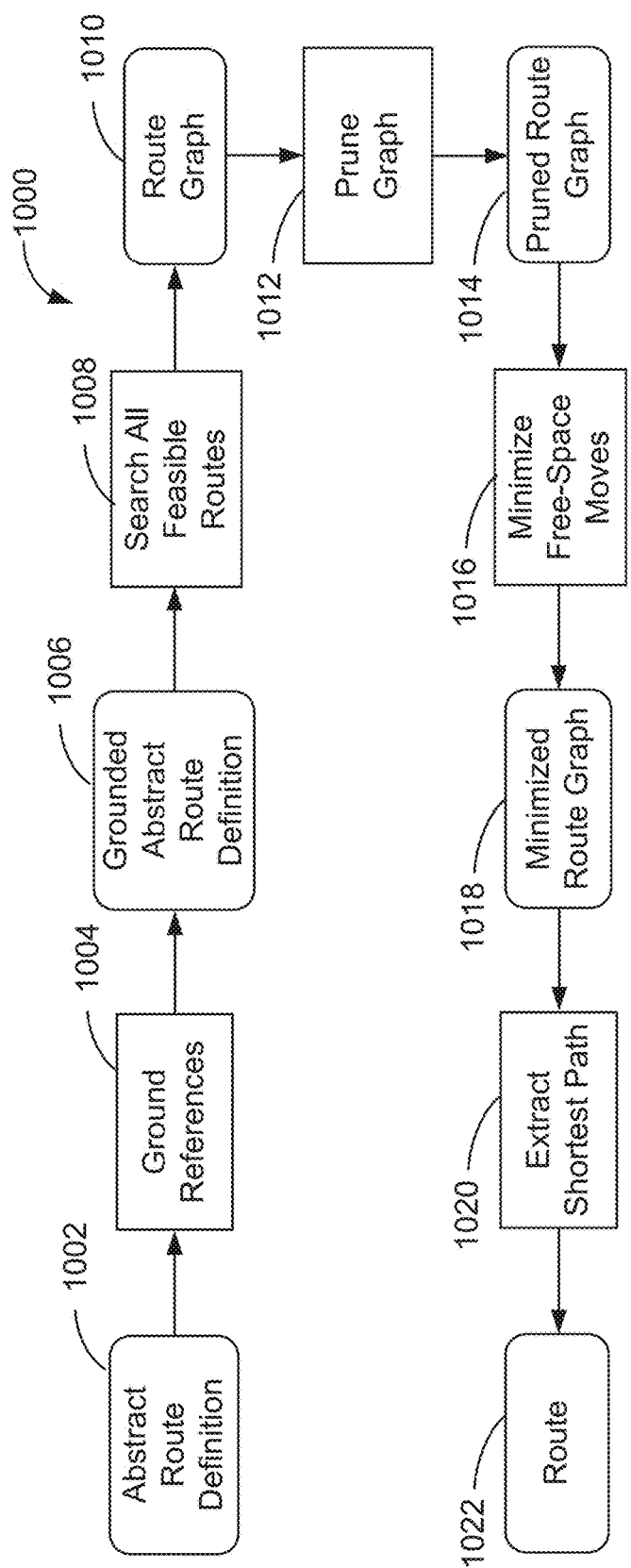
FIG. 10 illustrates a flowchart depicting a process for generating a route from an abstract route definition, in accordance with examples of the present disclosure.

Using inputs to the planning problem 408, planning module 502 generates executable path 516 by invoking a routing algorithm. FIG. 10 illustrates a flowchart depicting a process for generating a route from an abstract route definition, in accordance with examples of the present disclosure. Process 1000 starts with an abstract route definition 1002. Then, references are grounded 1004 to form grounded abstract route definition 1006. Grounded abstract route definition 1006 is then searched 1008 for all feasible routes, thereby generating route graph 1010. Route graph 1010 is then pruned 1012, resulting in pruned graph 1014. In some examples, pruned graph 1014 is further optimized by minimizing 1016 free space moves. In some examples, this optimization through free space minimization is optional. Last, the shortest path is extracted 1020 from minimized route graph 1018, thereby producing route 1022.

In some examples, the process, or routing algorithm, 1000 begins with grounding references 1004 named in abstract route definition 1002. In some examples, route planner 310 uses grounding references module 518 to perform step 1004. In some examples, grounding references includes looking up place names in navigation database 600. In some examples, grounding references also includes associating place names with traversable zones and associated poses/vertices. In other words, grounding references includes finding all the zones for the route and matching all zones that are part of each named place in the route. Grounding references 1004 produces grounded abstract route definition, or grounded clearance, 1006. In some examples, grounded abstract route definition 1006 comprises a series of data structures called "stages." Each stage corresponds to a start pose, a named place in the route ("on route"), or a destination. Stages are described in further detail with reference to FIG. 11. In some examples, references are grounded according to the following grounding rules: 1) If a named place is a named pose, e.g., "spot 1," then the named pose must be a destination, and the named pose plus the surrounding zones are listed in the stage. 2) If the named place is a runway, e.g., "16L," then the runway can either be a destination or on route. If the runway is a destination, then all entry points of the corresponding "threshold" zone plus the threshold zone itself is listed in the stage. Threshold entry points are entry points into the beginning of a runway. Threshold entry points are entry points that provide maximum takeoff distances for a given runway. If the runway is on route, then all zones associated with the runway plus all the vertices contained in the runway zones are listed in the stage. 3) If the named place is a taxiway, e.g., "A," then the taxiway must be on route (because a taxiway cannot be a destination), and all zones associated with the taxiway plus all the vertices contained in the taxiway zones are listed in the stage. 4) If the named place is a ramp, e.g., "Boeing Ramp," then the ramp must on route, and all zones associated with the ramp plus all the vertices contained in the ramp zones are listed in the stage. 5) If the named place is a stand, e.g., "C24," then the stand can either be a destination or on route. If the stand is a destination, then all the surrounding zones of the stand plus the pose of the stand is listed in the stage. If the stand is on route, then all zones associated with the stand and surrounding ramps plus all the vertices contained in the associated ramp zones are listed in the stage. In some examples, using these grounding rules, grounded abstract route definition 1006 is generated stage by stage. The route stages are then used to build a route graph 1010 by searching all feasible routes 1008.

Figure 11:
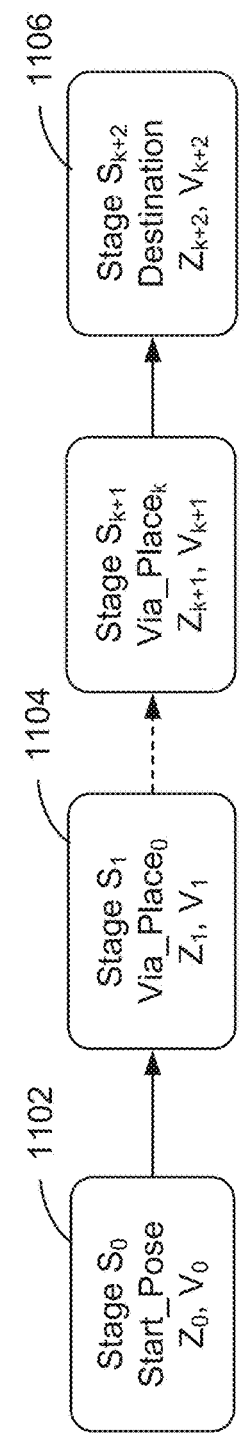
FIG. 11 shows an example of route stages for generating a route graph, in accordance with examples of the present disclosure.

FIG. 11 shows an example of route stages for generating a route graph, in accordance with examples of the present disclosure. Route stages 1100 correspond to an abstract route in the form of "From (Start_Pose) to (Destination) taxi (Via_Place$_0$ ..., Via_Place$_k$)." In some examples, the route stages 1100 contain k+2 stages, where k represents the number of places named in the abstract route (Via_Place$_0$ ..., Via_Place$_k$). Route stages 1100 starts with stage 1102, named S$_0$. Stage 1102 lists the starting pose (Start_Pose), derived from the state estimate. Then, using transitive closure, the set of zones Z$_0$ is determined. Z$_0$ includes the starting zone in which the start pose is located, as well as all zones connected to the starting zone with the same zone type as the starting zone. If the starting zone of Z$_0$ is a non-movement zone, then Z$_0$ is a transitive closure of connected non-movement zones. If the starting zone is a runway or a taxiway, then Z$_0$ is the transitive closure of movement areas of the same type and name as the starting zone. In some examples, the starting zone is often times a ramp. Next, a set of vertices V$_0$ is determined. V$_0$ is the set of all taxi vertices contained in Z$_0$. For the first stage 1102, V$_0$ is just the starting pose.

The second stage 1104 is named stage S$_1$. Stage 1104 is associated with the first named place in the abstract route (Via_Place$_1$). Stage 1104 includes a set Z$_1$ of all the zones named (Via_Place$_1$). Stage 1104 also includes a set V$_1$ of all the vertices contained in Z$_1$. The next k−1 stages are generated in the same manner as stage 1104.

The last stage 1106 is named stage S$_{k+2}$. This last stage is associated with the (Destination). Thus, the set of zones Z$_{k+2}$ and the set of vertices V$_{k+2}$ depend on the type of destination named in the route. If the destination is a pose, then Z$_{k+2}$ is the set of zones, determined through transitive closure, connected to the destination zone with the same zone type as the destination zone. In addition, V$_{k+2}$ is just the destination pose. If the destination is a runway, then Z$_{k+2}$ is the set of zones associated with the runway. In addition, V$_{k+2}$ is then the set of entry points into the runway.

Figure 12:
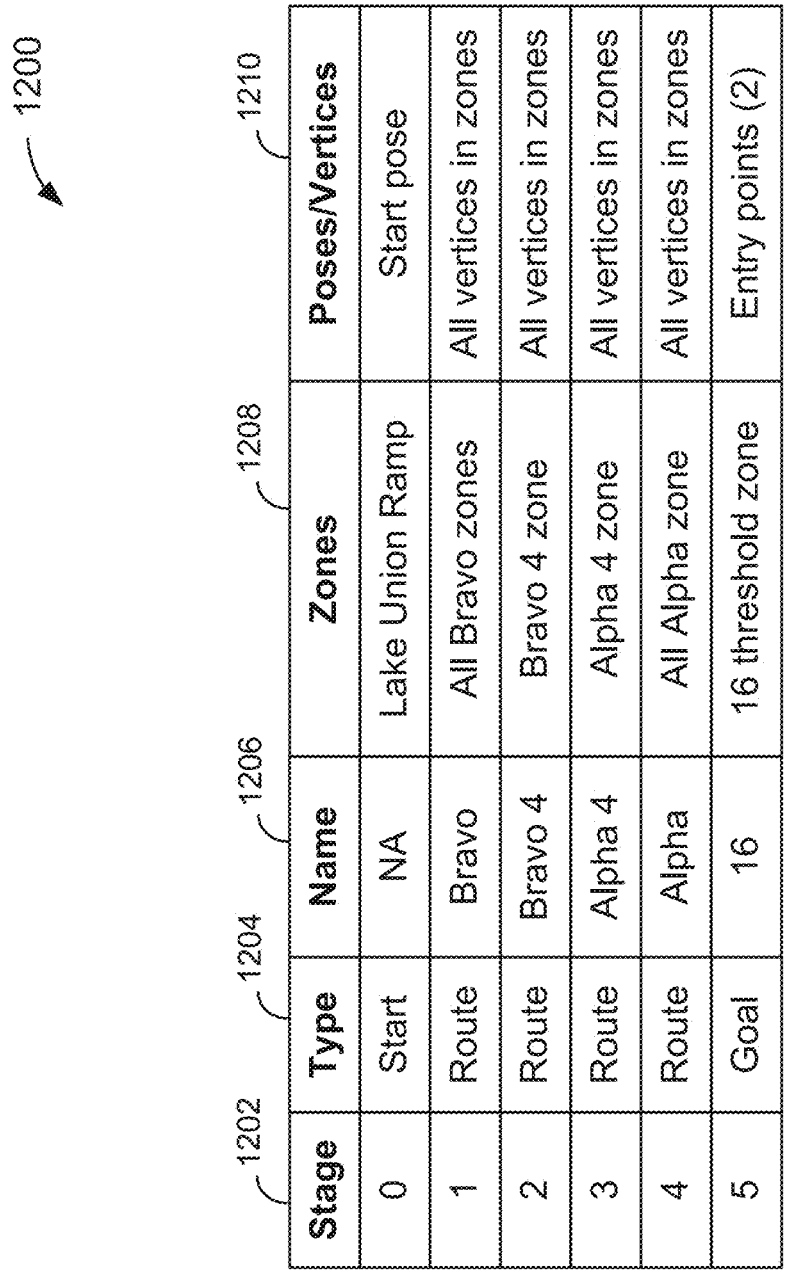
FIG. 12 shows a table representation of route stages generated for an example clearance, in accordance with examples of the present disclosure.

FIG. 12 shows a table representation of route stages generated for an example clearance, in accordance with examples of the present disclosure. In the example, the abstract clearance corresponds to "From (current_location) taxi (RWY 16) via (Bravo, Bravo 4, Alpha 4, Alpha)." Table 1200 includes a column for the stage number 1202, the type of stage 1204, the name of the place 1206, the set of zones 1208, and the set of poses/vertices 1210. As shown in table 1200, stage 0 (the first stage) includes the "Lake Union Ramp," which is the ramp in which the aircraft is currently located. In the example, Lake Union Ramp is not connected to any other ramps, so there is only one ramp listed in the zones column 1208. In addition, only the start pose is listed in the poses/vertices column 1210 because it is the first stage.

The second stage is labeled stage 1. Stage 1 is of the type "Route" because it is a named place in the abstract clearance/route. As mentioned above, the first named place in the clearance (Via_Place$_1$) is Bravo. Therefore, the set of zones 1208 is all zones named "Bravo." In addition, the set of poses/vertices 1210 is all the vertices contained in all Bravo zones. Stages 2-4 are similar to stage 1, except that each stage corresponds to a different named place in abstract clearance. The last stage is labeled stage 5. Note that the total number of stages in table 1200 is 6, which is 2 more than the number of named places (k) in the abstract clearance (4). Stage 5 is of the type "Goal." The name is "16," for runway 16. The set of zones 1208 is "16 threshold zone," meaning the threshold zone of runway 16, since the assumption is that the aircraft must end up at the beginning of the runway in order to take off. Last, the set of poses/vertices 1210 are the two entry points for the threshold zone of runway 16 (not shown).

Figure 13A:
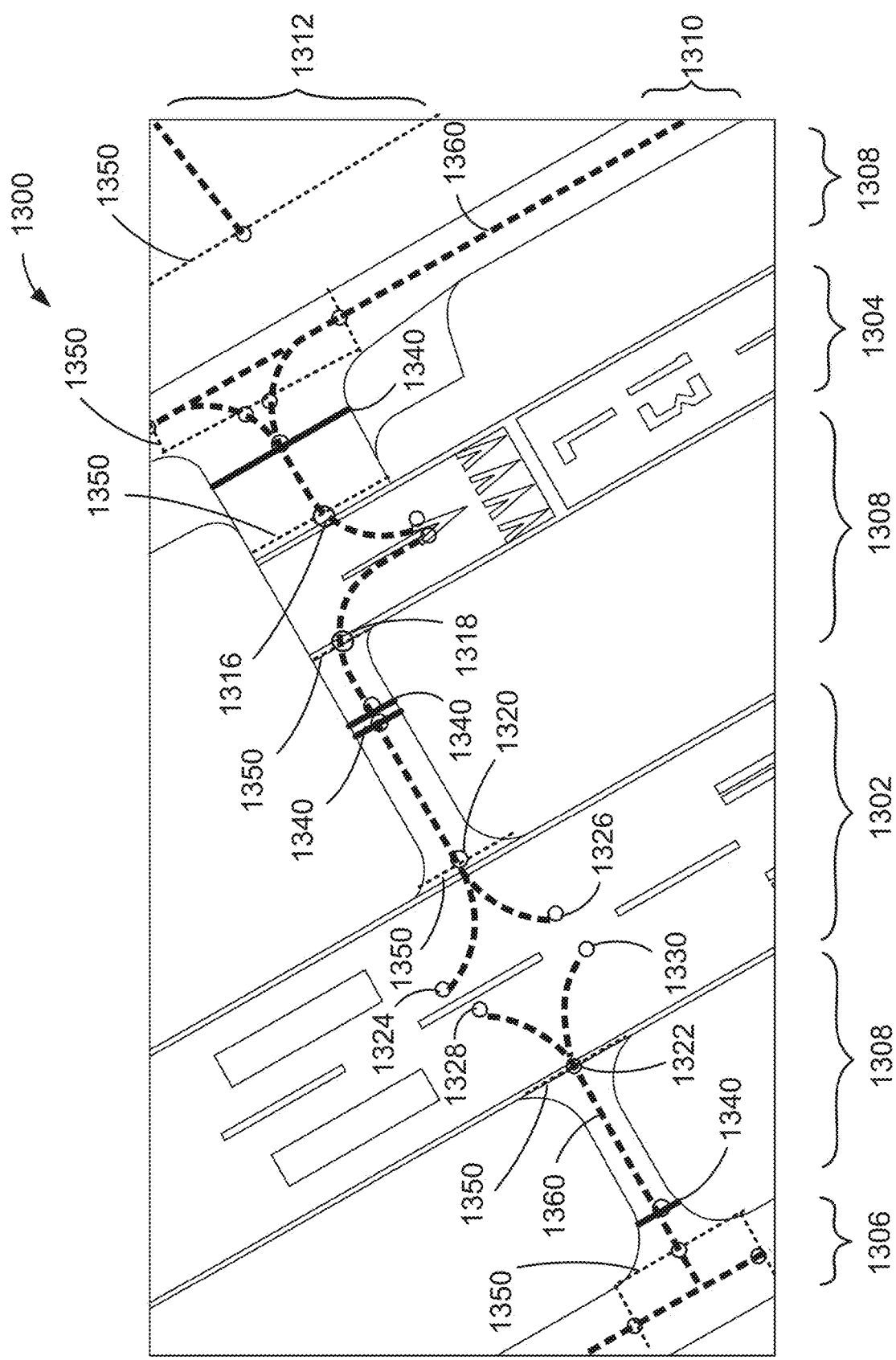
FIG. 13A shows an example of runway entry points, in accordance with examples of the present disclosure.

As with the example given in FIG. 12, often times the destination is a runway. In such examples, the goal vertices are the threshold entry points into the runway. FIG. 13A shows an example of runway entry points, in accordance with examples of the present disclosure. FIG. 13A includes a partial map 1300 showing taxi network vertices on a taxi network 1360. Map 1300 shows two runways, 1302 and 1304, three taxiways 1306, 1308, and 1310, and one ramp 1312. The runways, taxiways, and ramp are partitioned into zones. Each zone is demarcated by zone boundary lines 1350 (depicted as thin dotted lines). Multiple vertices are also shown in map 1300, such as vertices 1316, 1318, 1320, 1322, 1324, and 1326, along centerlines/guidelines 1360 (shown as heavy dashed lines), which altogether form taxi network 1360. Vertices 1316, 1318, 1320, and 1322 are all multi-zone vertices that are entry points into runways. However, only entry points 1316 and 1318 are threshold vertices because they are entry points into the threshold zone of runway 1304. Entry points 1320 and 1322 can be used only to enter runway 1302 for crossing the runway during taxiing purposes. In other words, entry points 1320 and 1322 cannot be used as destination/goal vertices, while entry points 1316 and 1318 can. In some examples, taxi network 1360 also includes exit vertices 1324, 1326, 1328, and 1330, which are sometimes used instead of entry points 1320 and 1322 for exiting runway 1302 if an aircraft was taxing along runway 1302 (as opposed to crossing it). Exit vertices are explained in further detail with regard to FIG. 13B.

Map 1300 also depicts hold lines 1340. In some examples, entry points 1316 and 1318 are guarded by hold lines 1340. Hold lines are lines on a taxiway near intersections of runways. An aircraft that is exiting a runway is not considered to have legally exited the runway until the aircraft taxis past the hold line.

Figure 13B:
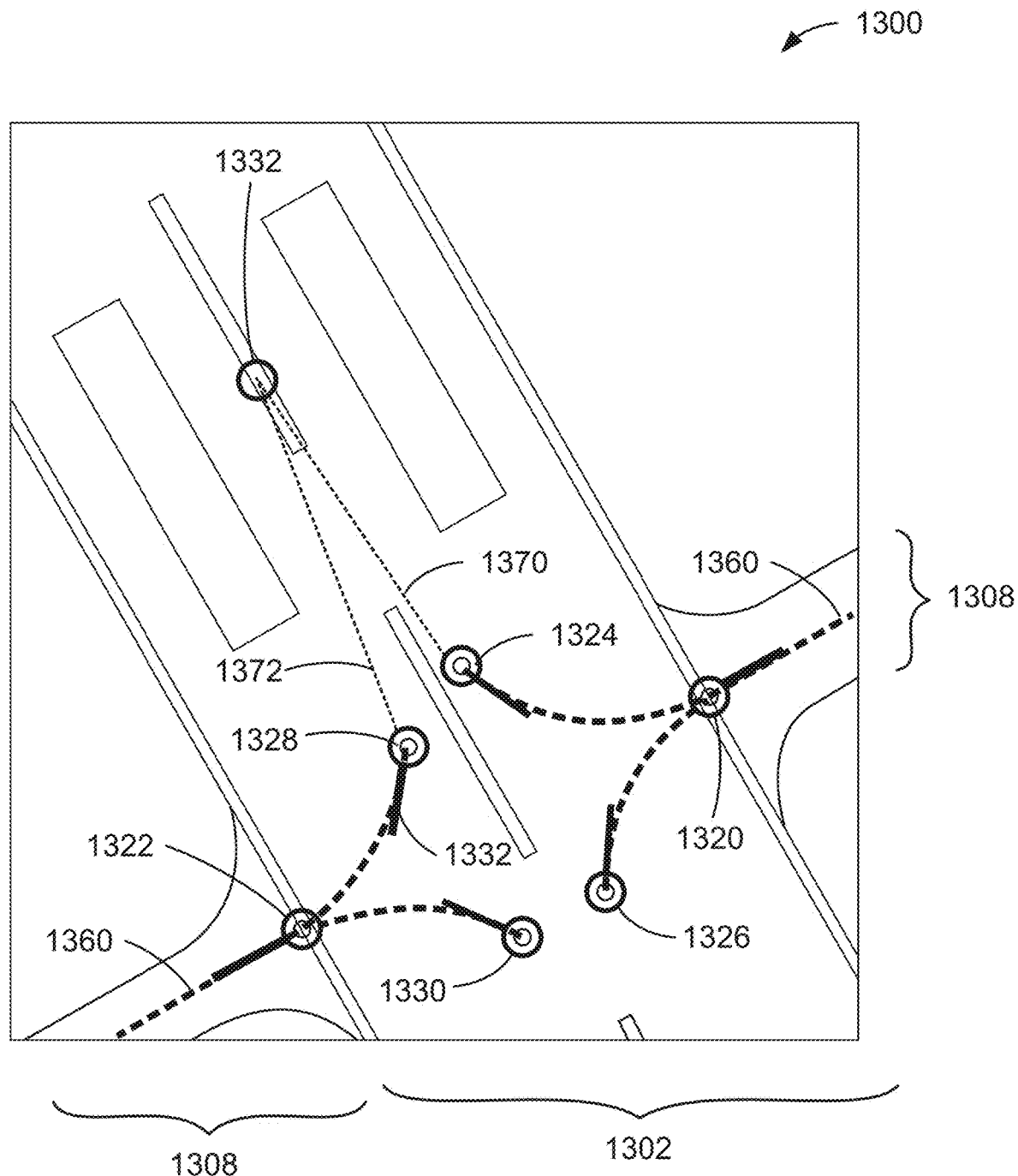
FIG. 13B shows an example of runway exit points, in accordance with examples of the present disclosure.

FIG. 13B shows an example of runway exit points, in accordance with examples of the present disclosure. FIG. 13B shows the same map 1300 as in FIG. 13A, but zoomed in around the intersection between runway 1302 and taxiway 1308. If a route included taxiing along runway 1302 and then subsequently exiting runway 1302 by turning onto taxiway 1308, the planned route would utilize exit points 1324, 1326, 1328, or 1330, instead of entry points 1320 and 1322. It should be noted that exit points 1324, 1326, 1328, and 1330 have associated headings 1332, or directions. This is because exit points allow an aircraft to get onto the taxi network and takes into account the minimum turning radius of an aircraft. Thus, if the planned route included exiting runway 1302 from position 1332, then the route would include either free space move 1370 to reach exit point 1324 or free space move 1372 to reach exit point 1328. From exit points 1324 or 1328, the planned route can resume along taxi network 1360.

Figure 13C:
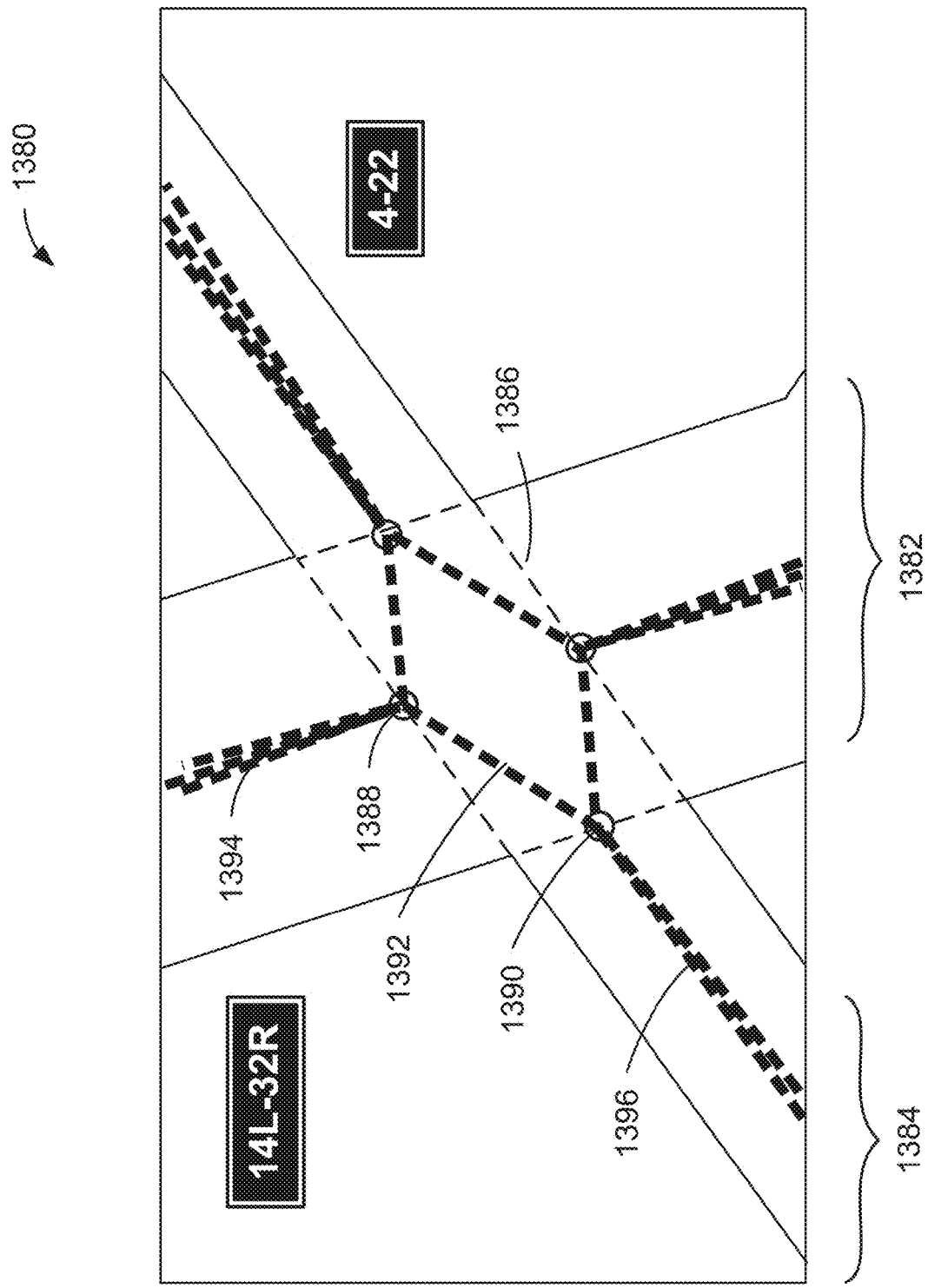
FIG. 13C shows an example of a runway intersection with putative edges, in accordance with examples of the present disclosure.

In some examples, free space moves 1370 and 1372 are initially generated as "putative," or presumed, edges in a route graph. Putative edges are edges in a route graph that are not explicitly part of the taxi network, but connect poses/vertices to each other using free space moves. In some examples, the edges are putative, as opposed to "concrete," because there can be many different free space paths going from vertex to another, and actually computing all those free space paths would be computationally expensive and unnecessary. Thus, as an optimization, when generating a search/route graph, the putative edges are left as putative until the need to make them concrete, through a process called "refining," arises. In addition, because taxi networks do not explicitly cross runways, taxi networks are often augmented with putative edges in order to address runway intersections. FIG. 13C shows an example of a runway intersection with putative edges, in accordance with examples of the present disclosure.

FIG. 13C shows runway intersection 1380 of runways 1382 (named "14L-32R") and 1384 (named "4-22"). It should be noted that since intersection 1380 is an intersection between two runways, then all edges are putative and not explicitly part of the taxiway network. For example, if a route included traveling along putative edge 1394, and needed to get onto putative edge 1396, then the route planner would calculate a putative edge 1392 from vertex 1388 to vertex 1390, each of which is sitting on a zone boundary 1386.

In some examples, once all the references have been grounded, then an exhaustive breadth-first search graph is generated. As used herein, the term "route graph" will be used interchangeably with "search graph." The search graph is exhaustive because all possible routes between the start pose and goals via the taxiway network are searched according to stage sequence. In some examples, a route graph is generated by building nodes and edges on top of the taxi network. Instead of vertices, as in the taxi network, the route graph has "nodes." Nodes are built on top of taxi vertices and poses. Each node represents a "state" in the route. In some examples, each state includes a position, a heading, and a stage number corresponding to a stage in the grounded abstract route definition. It should be noted that since a node has stage number associated with each state, a route graph node has a higher level of dimensionality than a taxi network vertex. Thus, the same taxi network vertex can be associated with two different search graph nodes (e.g., same position and heading, but different stage number).

Figure 14A:
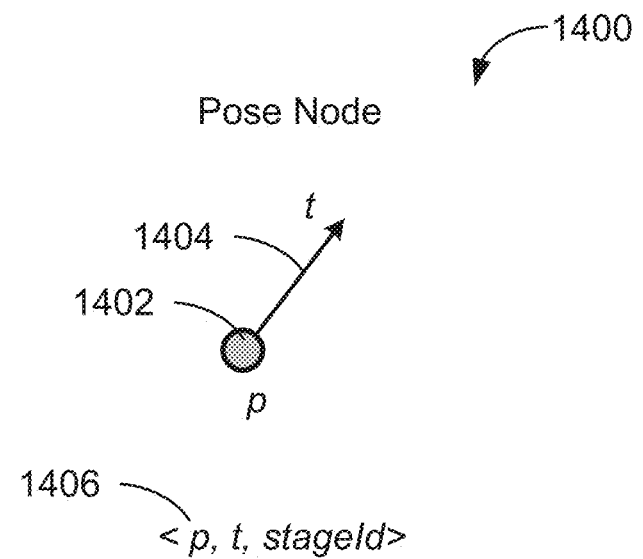
FIG. 14A shows an example of a pose node in a route graph, in accordance with examples of the present disclosure.

While edges in a taxi network represent a path from one vertex to another, an edge in a search graph represents a change in state from one node to another. Since search graph nodes are built on top of taxi vertices and poses, then edges in the search graph represent valid movements between states along taxi edges and free space moves. In other words, an edge in a search graph can mean a change in one or more of the following: position, heading, or stage. In some examples, a search graph includes two different types of nodes, a pose node and a taxi vertex node. FIG. 14A shows an example of a pose node in a route graph, in accordance with examples of the present disclosure.

The state space for a node is defined as a discretized affine 2D space, plus the stage number. Since SE(2) is the set of all possible transforms (poses) in the airport reference frame, the state space is a subset of SE(2). In other words the state space for a node is the space of all possible 2D affine transformations (rotation plus translation) plus the stage number. Thus, a pose can be defined as a translation (position) and a rotation (heading). The search is discrete because there is a limit to the number of moves that can get an aircraft from a start position to a destination. For a pose node, the transform is just the pose (position plus direction vector). Pose node 1400 includes a position 1402, denoted as "p," and a heading or direction vector 1402, denoted as "t." Pose node 1400 can either be a start node or a goal node. If pose node 1400 is a start node, then t is simply the heading given by the state estimate. If pose node 1400 is a goal node, then the heading is the direction given in the goal pose. Pose node 1400 also includes a stage number, denoted as "stageid." Together, "p," "t," and "stageid" define the state 1406 of pose node 1400.

Figure 14B:
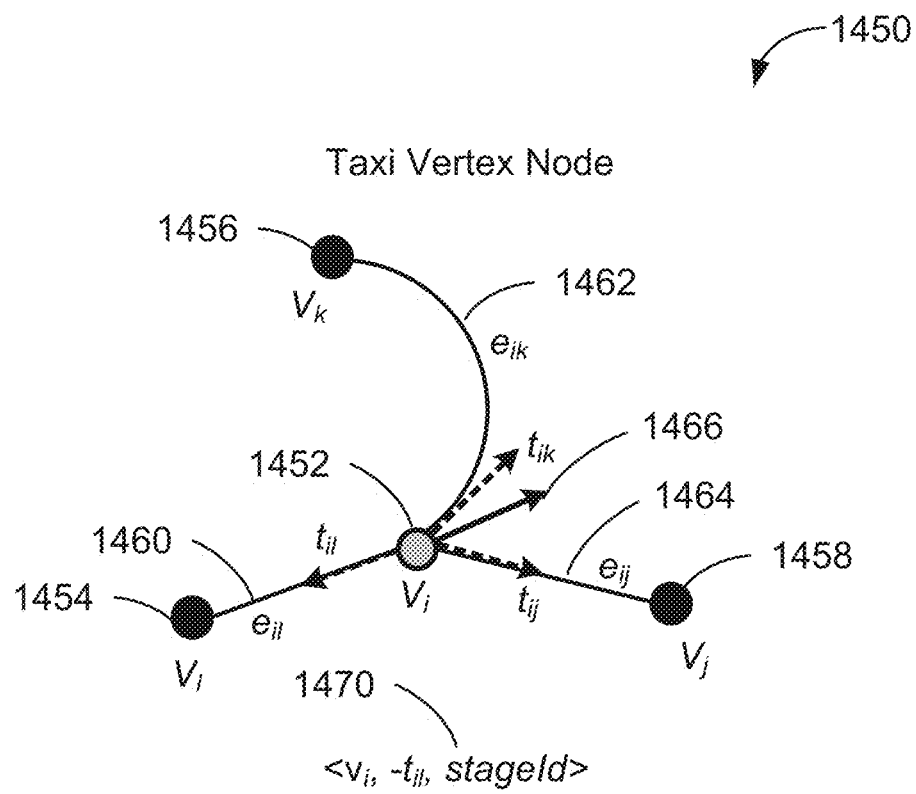
FIG. 14B shows an example of a taxi vertex node in a route graph, in accordance with examples of the present disclosure.

As previously mentioned, the state space for a pose node is simply the pose plus the stage number. However, a taxi vertex node is a little more complicated. For a taxi vertex node, the transform is the taxi vertex plus all possible edge tangent vectors for edges connected to the taxi vertex. An edge tangent vector for an edge is the direction that the aircraft has to face to start traveling along the edge. The state space for a taxi vertex node is limited by the number edge tangent vectors for a given taxi vertex and stage number because a taxi vertex can only be reached from the immediately surrounding taxi vertices along their respective taxi edges. FIG. 14B shows an example of a taxi vertex node in a route graph, in accordance with examples of the present disclosure. FIG. 14B illustrates taxi vertex 1452 and surrounding taxi vertices 1454, 1456, and 1458. Since taxi vertex 1452 is part of the taxi network, then it can only be reached by coming from surrounding taxi vertices 1454, 1456, and 1458, along edges 1460, 1462, and 1464, respectively. The heading for taxi vertex node 1450 depends on which taxi vertex was the immediately preceding taxi vertex. In FIG. 14B, the immediate preceding taxi vertex is taxi vertex 1454 ($V_j$). Thus, the heading 1466 is defined as "$-t_{ji}$," since $t_{ji}$ is defined as the direction of the vector going from taxi vertex 1452 to taxi vertex 1454. This is done because the heading vectors are given in perspective of vertex 1452. In other words, the heading for the taxi vertex node at a given taxi vertex represents the inbound direction of an aircraft traveling from a surrounding taxi vertex to the given taxi vertex. Therefore, the state 1470 of taxi vertex node 1450 is defined as $<v_i, -t_{ji}, stageid>$. If the immediately preceding taxi vertex was 1456 ($V_k$), then heading 1466 would be "$-t_{ik}$," since $t_{ik}$ is defined as the direction from taxi vertex 1452 to taxi vertex 1456. Since each pose node is given by the start and/or goal pose, then the space extent for the search graph is a finite subset of SE(2) in the form of the union of all the taxi vertices ($U_{i \in [0,n]} V_i$) combined with their tangents plus start and/or goal pose(s) combined with their heading vectors.

Figure 15A:
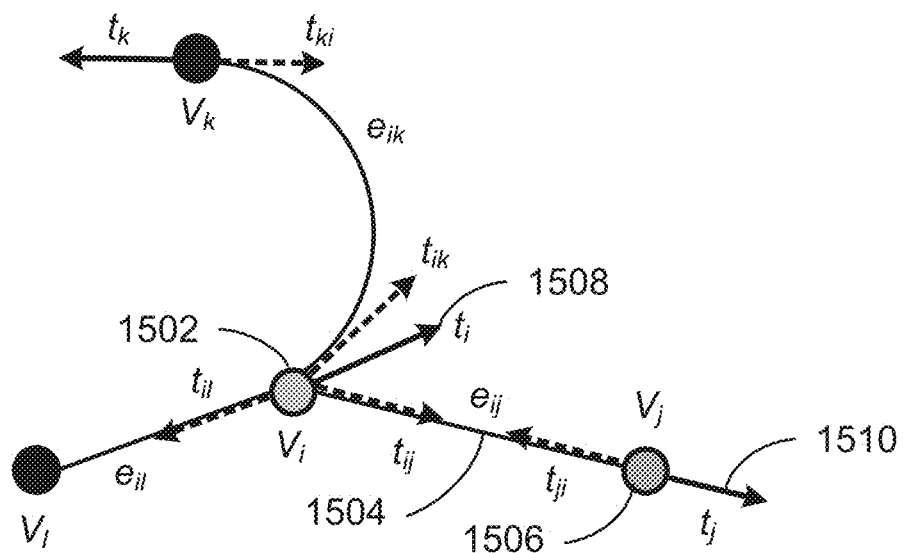
FIGS. 15A-15C show examples of search graph edges in a route graph, in accordance with examples of the present disclosure.
Figure 15B:
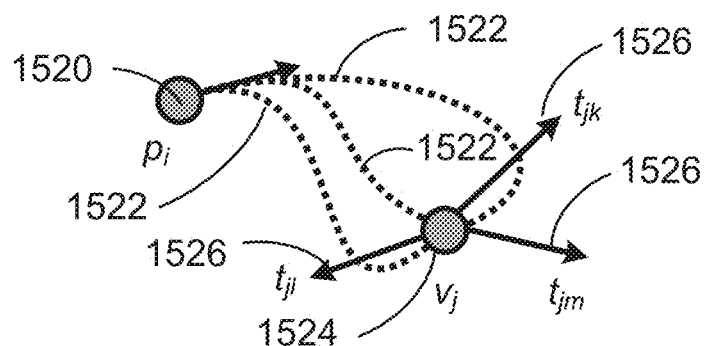
Figure 15C:
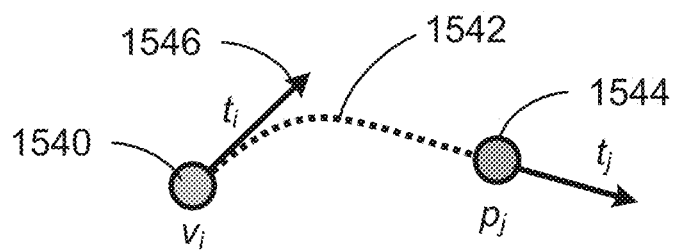

FIGS. 14A and 14B illustrate how to build search graph nodes. Search graph nodes are connected by search graph edges. FIGS. 15A-15C show examples of search graph edges in a route graph, in accordance with examples of the present disclosure. Since there are only two types of nodes, pose and taxi vertex, there can only be three types of edges: 1) an edge that connects a taxi vertex node to taxi vertex node (V2V), 2) an edge that connects a pose node to a taxi vertex node (P2V), and 3) an edge that connects a taxi vertex node to a pose node. It should be noted that since pose nodes can only be start or goal nodes, there cannot be an edge that connects a pose node to another pose node.

FIG. 15A shows a V2V edge. As previously stated, an edge represents a change in state from one node to another. Thus, in an edge, a change in any of a position, heading, or stage, represents a different state. V2V edges follow taxi lines. Consequently, V2V edges borrow the shape of the path between taxi vertices in the taxi network. However, V2V edges are search graph edges, and thus have a higher dimension of temporality (e.g., stages). To generate a V2V edge, the following conditions must apply:

Edge ($<v_i, t_i, k>$, $<v_j, t_j, l>$) exists iif:
1) $v_i$ and $v_j$ are connected by a taxi edge $e_{ij}$,
2) $t_i \char`\^ t_{ij} \leq 90°$,
3) $v_j \in V_k$ and l=k or $v_j \in V_{k+1}$ and l=k+1, and
4) $t_j = -t_{ij}$.

In other words, V2V edge 1504 represents a legal move if and only if: 1) it is an actual path on the ground connecting to initial node 1502 and successor node 1506, 2) the angle between headings 1508 and 1510 is less than or equal to 90°, 3) successor node 1506 is an element of all vertices in the current stage or the stage immediately following the current stage, and 4) heading 1510 at successor node 1506 is the inbound direction to successor node 1506 when following edge 1504 from initial node 1502 to successor node 1506.

FIG. 15B shows P2V edges. P2V edges are free space moves because they do not follow taxi lines. However, since the successor node 1524 is a taxi vertex node that has taxi edges connecting to other taxi vertex nodes (not shown), the number of edges from initial pose 1520 is limited by the number of poses corresponding to the number of edges branching from the taxi node 1524. For example, FIG. 15B illustrates only three legal edges 1522 because taxi node 1524 has only three associated headings 1526. To generate a P2V edge, the following conditions must apply:

Edge ($<p_i, t_i, k>$, $<v_j, t_j, l>$) exists iif:
1) $v_j$ is one of K nearest neighbors of $p_i$,
2) $v_j \in V_k$ and l=k or $v_j \in V_{k+1}$ and l=k+1, and
3) $t_j$ is a tangent of $v_j$.

In other words, P2V edges 1522 represent legal moves if and only if: 1) successor taxi node 1524 is one of K nearest neighbors of initial pose node 1520 (where K is predefined integer, e.g., 10 or 15), 2) successor taxi node 1524 is an element of all vertices in the current stage or the stage immediately following the current stage, and 3) headings 1526 are tangents of successor taxi node 1524. As previously mentioned, headings 1526 are finite in number because they correspond to edges in the taxi network.

FIG. 15C shows a V2P edge. V2P edges are free space moves because they do not follow taxi lines. However, since the successor node 1544 is a pose node with a single heading, meaning there are only two positions and two headings, then there is only one optimal legal path that is generated between the two nodes. In some examples, the system assumes that path 1542 follows a smooth curve. To generate a V2P edge, the following conditions must apply:

Edge ($<v_i, t_i, k>$, $<p_j, t_j, l>$) exists iif:
1) $v_i$ is one of K nearest neighbors of $p_j$,
2) $p_j \in V_k$ and l=k or $p_j \in V_{k+1}$ and l=k+1, and
3) $t_i$ is a tangent of $v_i$.

In other words, V2P edge 1542 represents a legal move if and only if: 1) successor pose node 1544 is one of K nearest neighbors of initial taxi vertex node 1540, 2) successor pose node 1544 is an element of all vertices in the current stage or the stage immediately following the current stage, and 3) heading 1546 is a tangent of initial taxi node 1540.

Now that search graph nodes and edges have been defined, an example process for generating the search graph can be presented. First, a start node is generated. Since the node is based on a starting pose, then that means the starting node is a pose node. Next, a goal pose/entry vertex node is generated. This will either be a pose or a vertex node. Next, the start node is connected to its K neighboring taxi vertices. As mentioned above, K is a predefined integer, e.g., 10 or 15. If the goal node is a pose, then the goal node also connected to its K neighboring taxi vertices.

Then, the start node is pushed into a queue. The queue is a data structure that reflects a list of nodes to explore. Thus, the search graph generation algorithm starts when the queue is empty. After pushing the start node in the queue, a breadth-first graph expansion is performed until quiescence. The breadth-first graph expansion includes first popping a node from the queue. Then all possible new moves/edges are generated, which then results in the computation of successor nodes. Last, the successor nodes are pushed into the queue. For each vertex in the set of vertices for each stage, the vertex is promoted into a set of search nodes by combining it with its tangents and then connecting each of those combinations to the start node or the goal node.

In some examples, successor nodes are either nodes that can be reached through valid edges, as described above with reference to FIGS. 15A-15C, or nodes that can be reached by crossing a runway. If the successor node is a node that can be reached by crossing a runway, then one or more putative edges are approximated by using Dubins shortest path without obstacles. In some examples, runway crossing moves are generated each time the search reaches the edge of a runway. Once a node at the edge of a runway is reached, free space moves to all runway exits/entry points consistent with the stage sequence are generated. In some examples, this can lead to superfluous moves that are putatively generated, but can be pruned in later processing stages.

Figure 16:
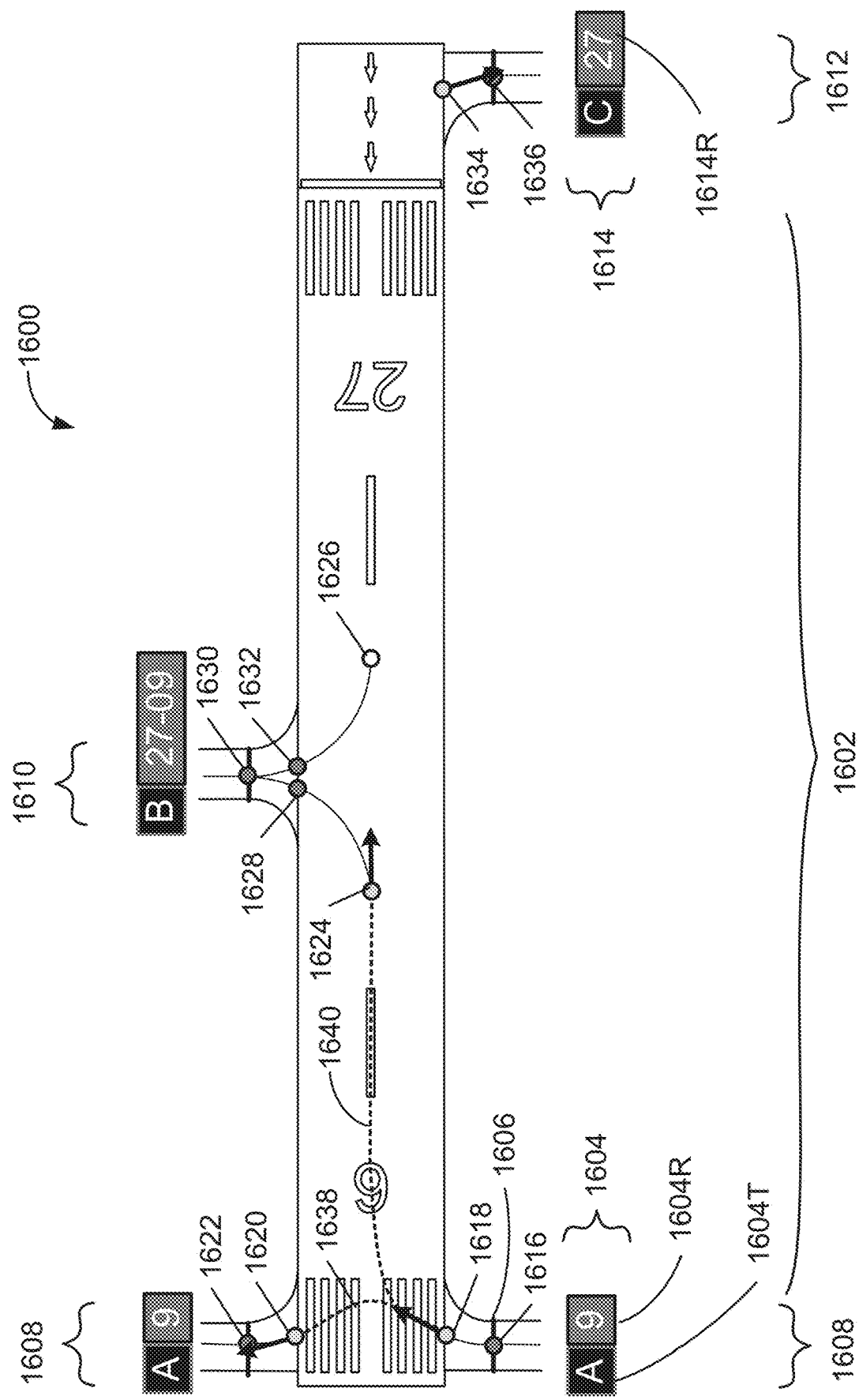
FIG. 16 shows an example how to generate search graph edges at runway crossings, in accordance with examples of the present disclosure.

FIG. 16 shows an example how to generate search graph edges at runway crossings, in accordance with examples of the present disclosure. Runway crossing 1600 illustrates runway 1602, which is used as either runway 9 (if taking off from left to right) or runway 27 (if taking off from right to left). Each taxiway in runway crossing 1600 includes a runway hold line sign 1604, which has two components 1604T and 1604R. Sign component 1604T labels the taxiway on which a hold line 1606 is located. Sign component 1604R labels the runway that is intersecting the taxiway. Thus, in the example, taxiway 1608 is labeled "A," taxiway 1610 is labeled "B," and taxiway 1612 is labeled "C." It should be noted that sign component 1614R of runway hold line sign 1614 is labeled "27," because the runway 1602 is used from right to left if coming from taxiway 1612.

In the example illustrated in FIG. 16, node 1618 is the current node for which an edge across runway 1602 needs to be generated because node 1618 is a runway entry node. That means the exit nodes for runway 1602 are 1620, 1628, 1632, and 1634. Runway crossing 1600 also illustrates hold line nodes 1616, 1622, 1630, and 1636. Hold line nodes are nodes located on hold lines, such as node 1616 located on hold line 1606. Runway crossing 1600 also includes two exit guide nodes 1624 and 1626. In the example illustrated in FIG. 16, certain downstream relationships are worth noting. For example, hold line node 1622 is downstream from node 1620. In addition, hold line node 1630 is downstream from nodes 1628 and node 1624. Similarly, hold line node 1630 is also downstream from both node 1632 and node 1626. Last, hold line node 1636 is downstream from node 1634.

As previously mentioned, FIG. 16 illustrates an example of how to generate a search graph edge at a runway crossing. Starting from current node 1618, which has a current stage "A" and a next stage "B," an edge is created that connects with an exit node with a valid stage "A" or "B." In the example, this refers to creating edges 1638 and 1640, since the exit node in the current stage "A" is node 1620 and the exit nodes in the next stage "B" are nodes 1628 and 1632. This follows the valid edge rules described above with reference to FIGS. 15A-15C. However, if multiple exit nodes share the same downstream hold line node, then an edge is only connected to the nearest node. In the current example, hold line node 1630 is downstream from both exit nodes 1628 and 1632. Thus, edge 1640 only connects to exit node 1628, since it is nearer to current node 1618 than exit node 1632. Last, if an exit node is downstream from a guide node, then the edge connects to the nearest guide node instead of the exit node. In the current example, exit node 1628 is downstream from guide node 1624. Therefore, edge 1640 connects to guide node 1624 instead of directly to exit node 1628. Thus, the two edges generated from current node 1618 are edges 1638 and 1640 connecting to nodes 1620 and 1624, respectively.

Following the steps outlined above, a complete search graph is generated. It should be noted that most of the time, only one goal will be reached. However, in the event of a tie, the tie breaker occurs in later stages of the routing algorithm. Once an exhaustive breadth-first search graph has been generated, the resulting graph is further processed to find a solution path. One further process is called pruning. Since the complete route graph is a directed graph, the edges can only be followed in one direction. Nodes in the graph that only have inbound edges are called "sink" nodes. Any sink nodes that are not the goal node can be considered a dead-end node. Branches that lead to dead-end nodes are called dead-end branches. Pruning is a processing step used to eliminate dead-end branches so that the only sink nodes in the graph are goal nodes. During the pruning process, all the sink nodes that are not goal nodes are found and then subsequently deleted. Consequently, all edges directly leading into the deleted sink nodes become dangling (not leading to a node) and are also subsequently deleted. Deleting the dangling edges produces new sink nodes. This erosion process repeats itself until the only sink nodes left are the goal nodes. Once the graph has been pruned, a further optimization step can be optionally implemented.

Figure 17:
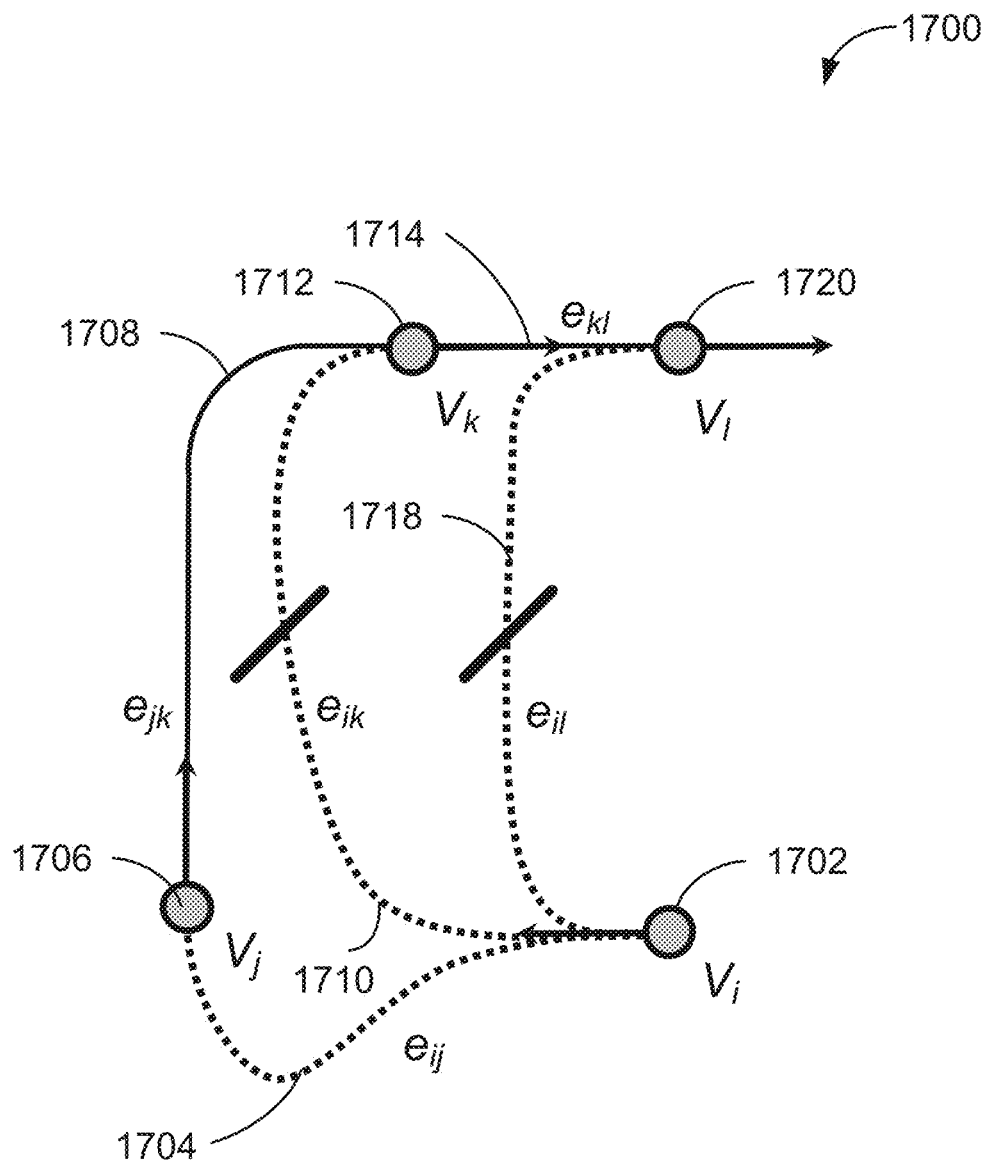
FIG. 17 shows an example of free space move minimization, in accordance with examples of the present disclosure.

FIG. 17 shows an example of free space move minimization, in accordance with examples of the present disclosure. In some examples, the free space move minimization is only applied to the source node and all sink nodes in the pruned graph, a.k.a. the start and goal nodes. This is because redundant runway intersection free space paths are either pruned or weeded out during extraction of the shortest path. The goal of minimizing free space moves is to delete the longest free space edges. This is to make the aircraft more predictable by getting on the taxi network as soon as possible. Sometimes this leads to situation where the desired path is actually not the "fastest" path because the "fastest" path might be one that contains much longer free space moves. This is further illustrated in FIG. 17.

In the example shown in FIG. 17, the set of free space start moves 1700 illustrate free space edges 1704, 1710, and 1718, which connect starting node 1702 to taxi vertex nodes 1706, 1712, and 1720, respectively. While the set of free space moves 1700 illustrates three different free space edges, during free space move minimization, only one edge, 1704, remains because it is the shortest free space edge. In order to minimize free space moves, redundant free space paths need to first be identified. A free space path is redundant if there are multiple free space paths that can be used to get from a first node to a second node. Redundant free space paths can be found by computing the set of undirected cycles containing the current node (either the start node or the goal node) and at least one free space edge, and then subsequently deleting the longest free space edge. The process is repeated until there are no more undirected cycles containing the current node and at least one free space edge. This can be expressed with the following function:

```
Procedure minimize_free_space_moves(v)
    while True do
        Compute C the set of undirected cycles containing v and at
        least one free-space edge
        if C = ∅ then
            break
        else
            Let E be the set of free-space edges supporting the cycles in C
            Find e the longest free-space edge in E
            Delete e
```

In some examples, a cycle is a sequence of edges and/or vertices connected in a loop. In the current example, a cycle is expressed in edges. For example, a cycle in FIG. 17 can be expressed as (1704, 1708, 1710). Referring back to FIG. 17, initially computing C gives C={(1704, 1708, 1710), (1704, 1708, 1714, 1718), (1710, 1714, 1718)}. Consequently, E is initially computed as E={1704, 1710, 1718}, because edges 1708 and 1714 are taxi network edges. Out of initially computed E, free space edge 1710 is deleted as the longest free space edge in E. The cycle repeats itself again. In the second pass, C=((1704, 1708, 1714, 1718)) and E=(1704, 1718). Since free space edge 1718 is longer than edge 1704, edge 1718 is deleted. After deleting edge 1718, there are no more cycles in C and the process stops. It should be noted that although edge 1718 would have been the shortest and fastest way to get from node 1702 to node 1720, the algorithm chooses edge 1704 instead because it minimizes the movement in "free space."

When generating the search graph, putative moves are initially approximated and then only "refined," or made concrete, as needed. In other words, free space moves are only calculated as needed during the free space move minimization step, or in the shortest path extraction step. Putative moves are "refined," or made concrete, by invoking the free space planner. In some examples, the free space planner invokes Dubins algorithm and then subsequently calls a more heavy duty planner, such as the rapidly-exploring random tree (RTT) algorithm. In some examples, the free-space planner uses the clearance constraints to produce conflict-free paths.

Once free moves are minimized and/or putative moves are refined, then the path extraction planner is invoked to extract the shortest path from the start pose to the goal. In some examples, the algorithm used is Dijkstra's algorithm or any dynamic programming algorithm. The shortest path extracted is returned as the output to route planner 310.

Figure 18:
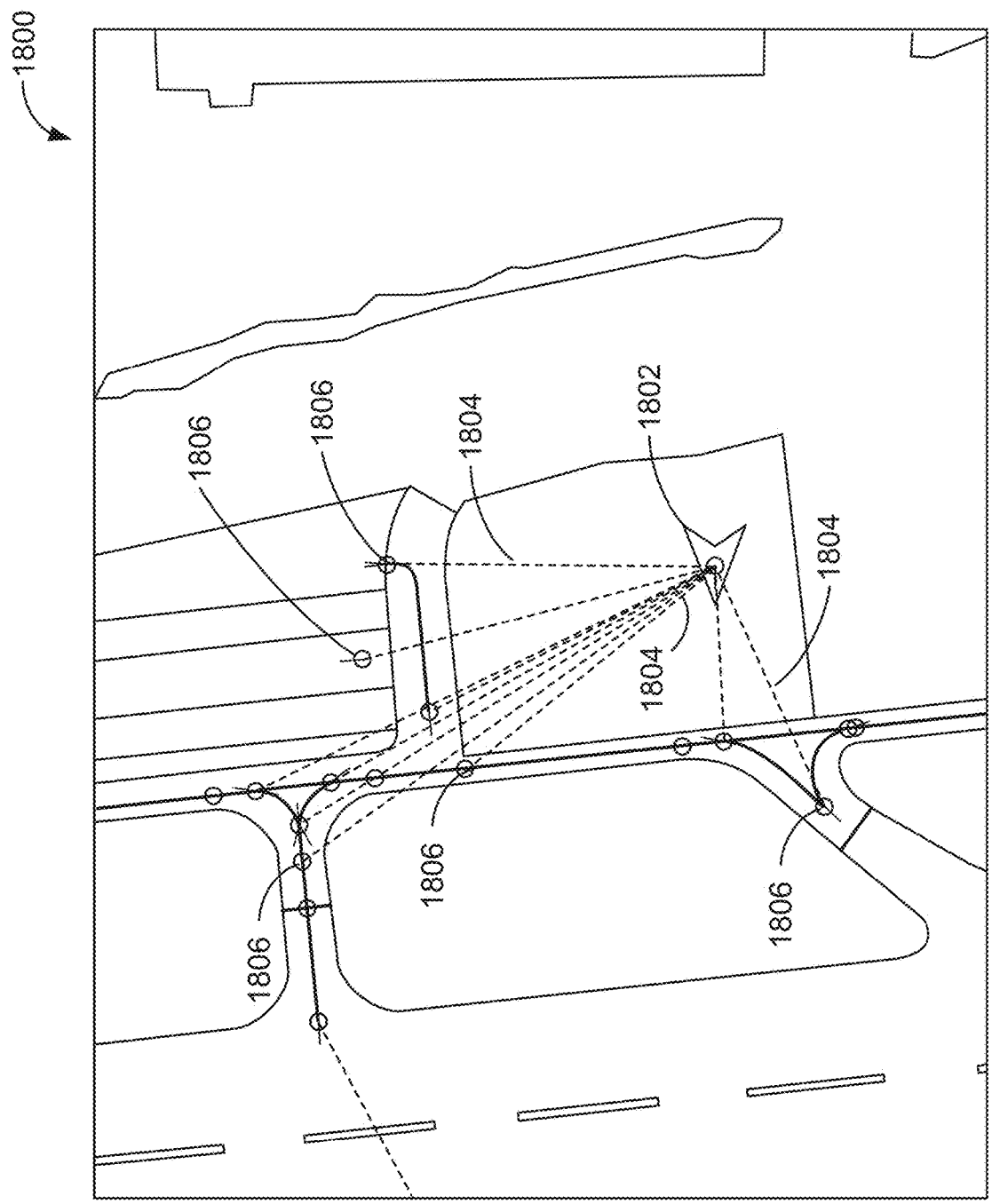
FIG. 18 shows an example of putative moves from a start pose, in accordance with examples of the present disclosure.

The following examples illustrate different steps in the processes described above. FIG. 18 shows an example of putative moves from a start pose, in accordance with examples of the present disclosure. Zoomed in map 1800 shows putative moves 1804 connecting start pose 1802 to K neighboring taxi vertices 1806. In FIG. 18, K is predefined as 10.

Figure 19A:
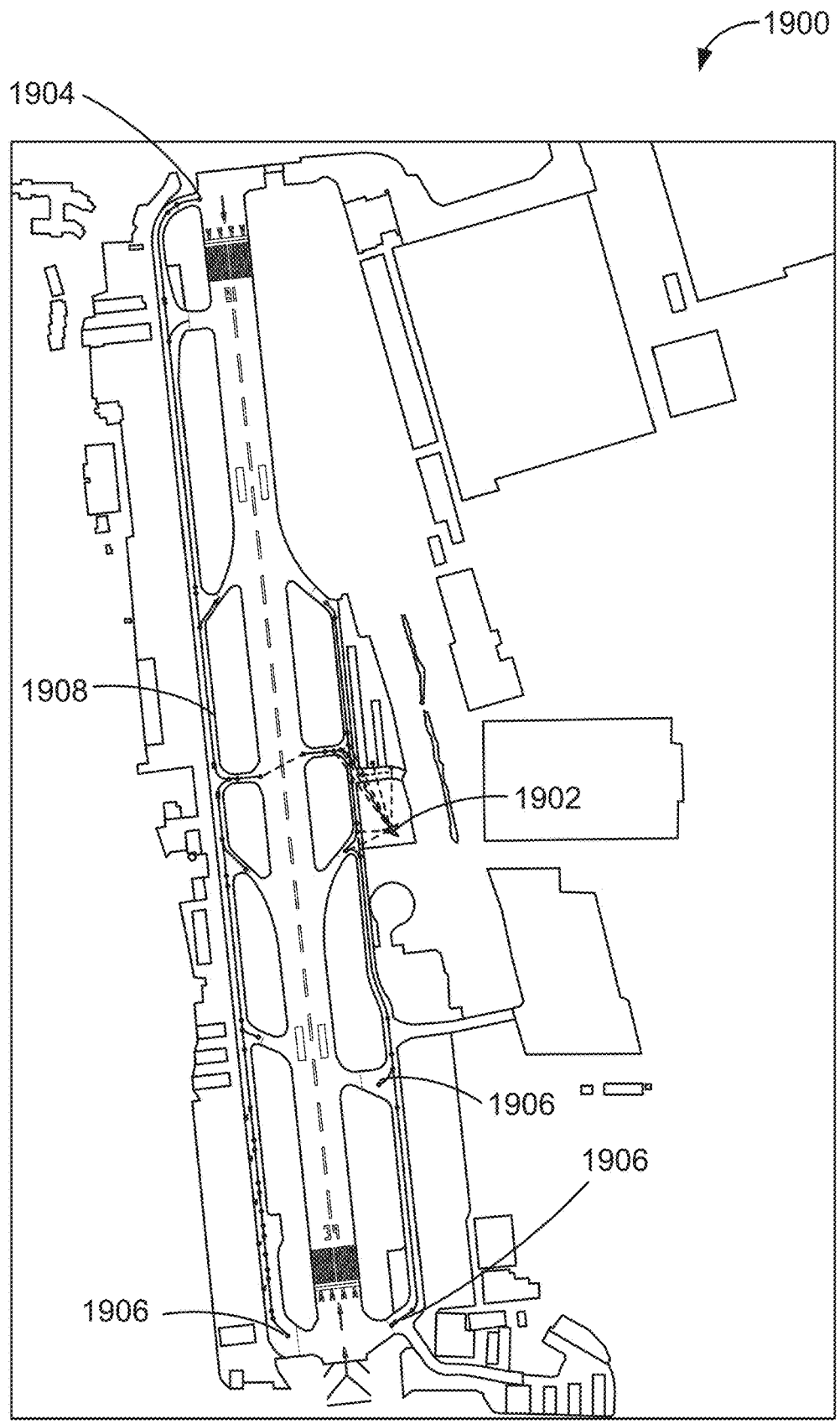
FIG. 19A shows an example of a complete route graph, in accordance with examples of the present disclosure.

FIG. 19A shows an example of a complete route graph, in accordance with examples of the present disclosure. Map 1900 shows various paths 1908 connecting start pose 1902 to destination pose 1904 and various sink nodes 1906.

Figure 19B:
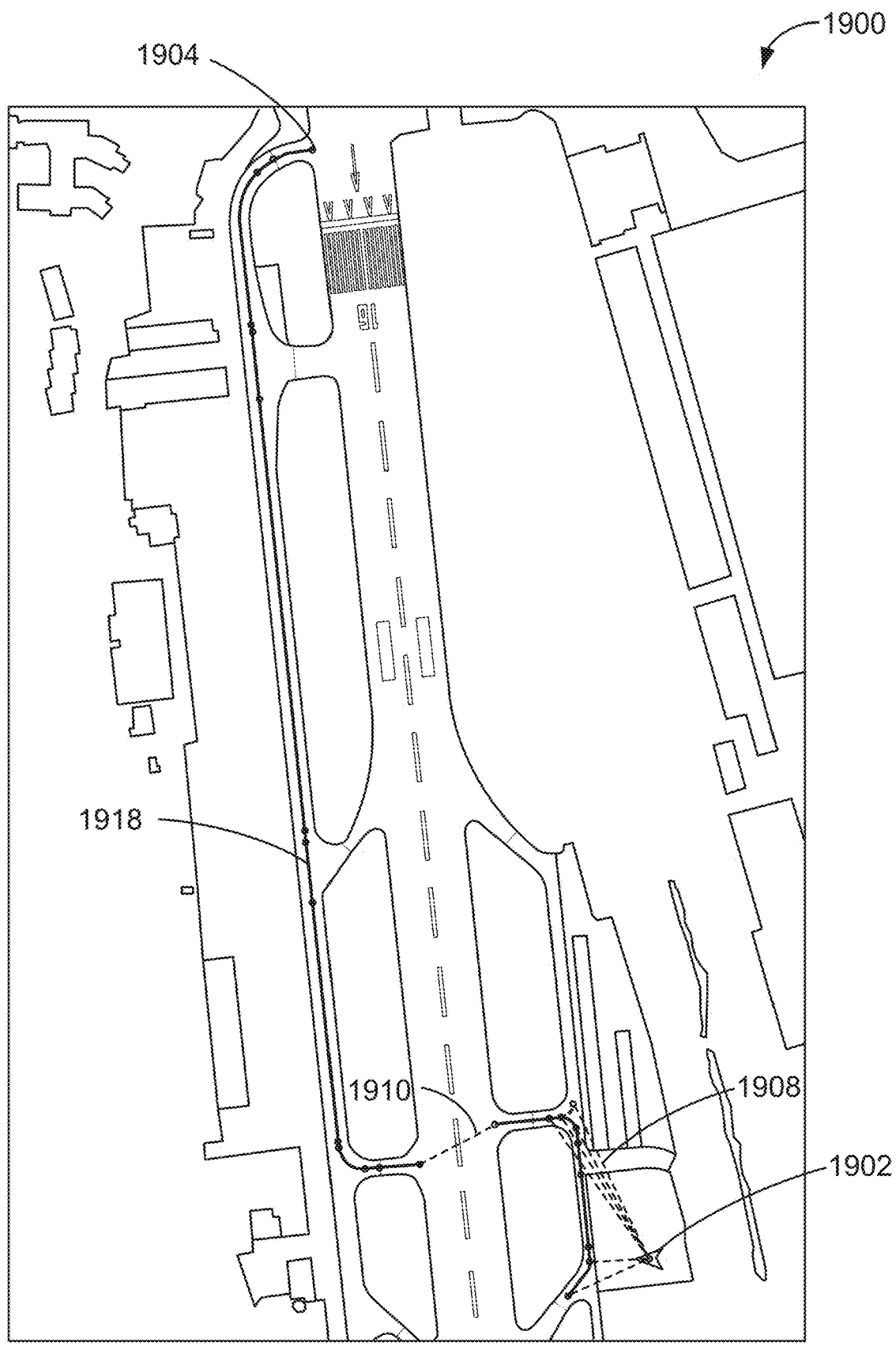
FIG. 19B shows an example of a pruned route graph, in accordance with examples of the present disclosure.

FIG. 19B shows an example of a pruned route graph, in accordance with examples of the present disclosure. FIG. 19B shows the same map 1900 but with a pruned graph 1918 connecting start pose 1902 with destination 1904. It should be noted that edges 1908 and 1910 are still putative at this point. In addition, all sink nodes 1906 and their corresponding edges have been deleted.

Figure 19C:
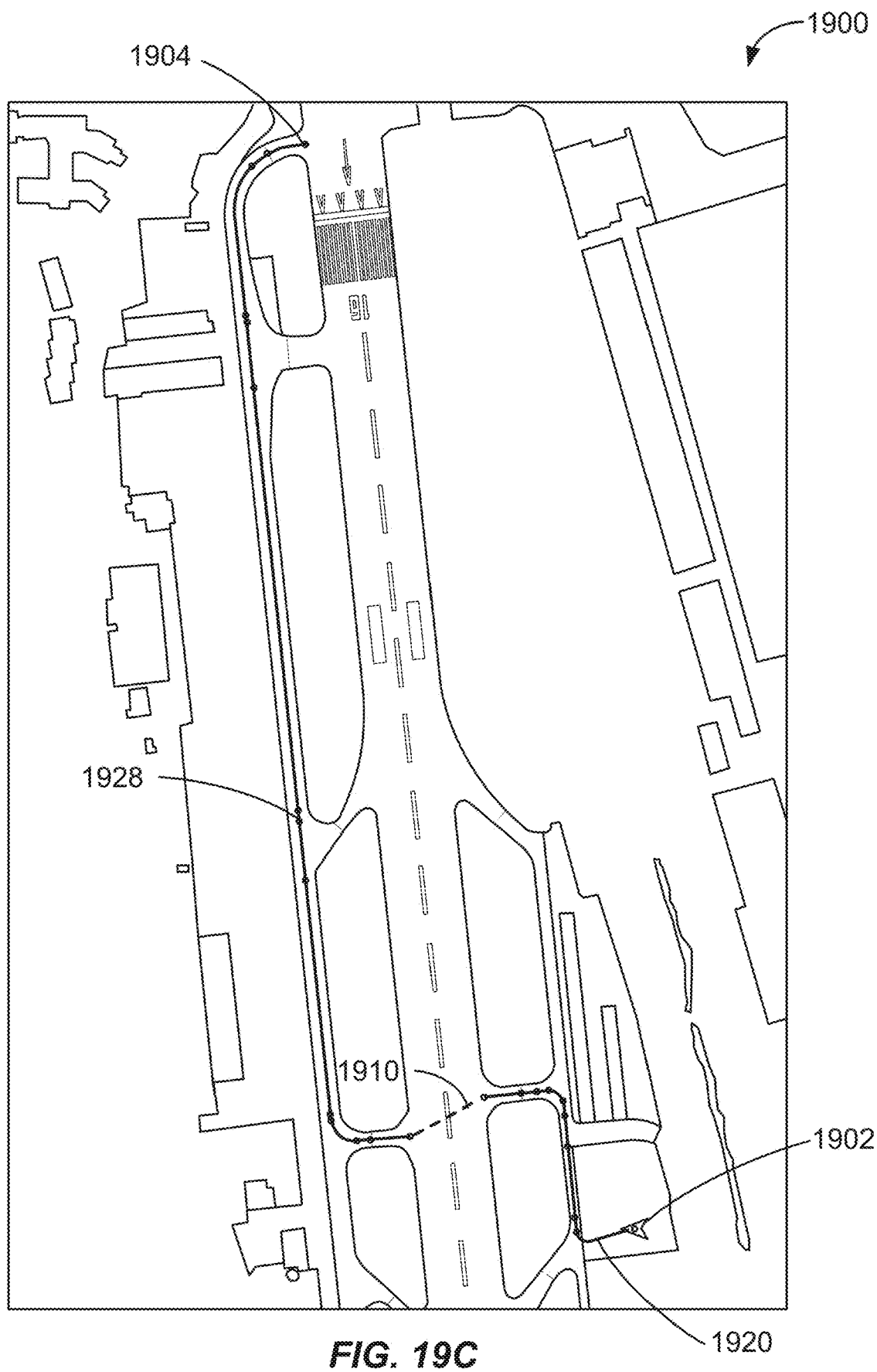
FIG. 19C shows an example of a minimized route graph, in accordance with examples of the present disclosure.

FIG. 19C shows an example of a minimized route graph, in accordance with examples of the present disclosure. FIG. 19C shows the same map 1900 but with a minimized graph 1918 connecting start pose 1902 to destination 1904. The putative edges 1908 at start node 1902 have been eliminated and converted into a single refined free space edge 1920. It should be noted that since putative edges are only refined as needed, putative edge 1910 crossing the runway remains putative at this point.

Figure 19D:
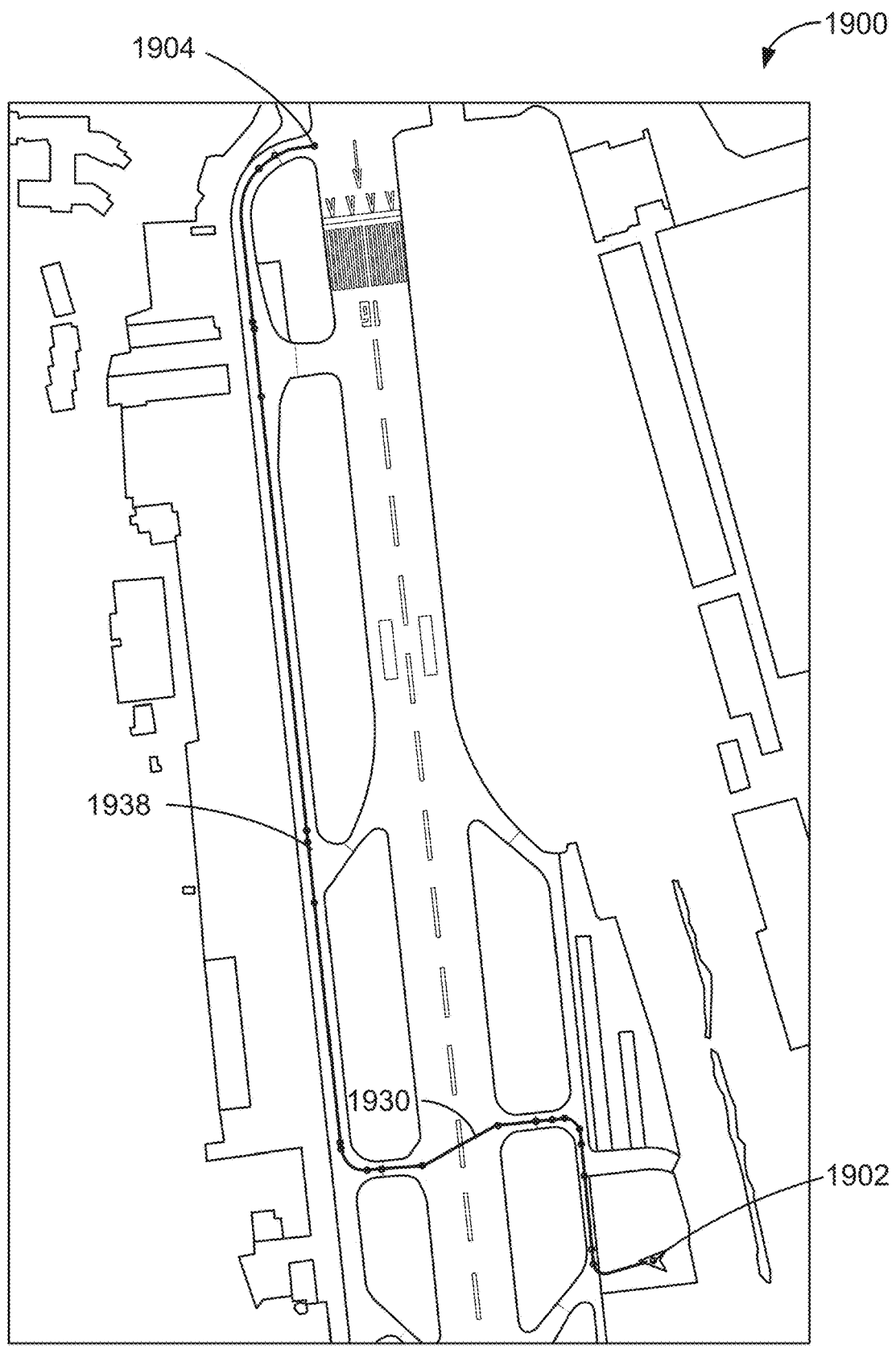
FIG. 19D shows an example of a refined route graph, in accordance with examples of the present disclosure.

FIG. 19D shows an example of a refined route graph, in accordance with examples of the present disclosure. Refined route graph 1938 differs from minimized route graph 1928 because putative edge 1910 in minimized route graph 1928 has been refined into a concrete edge 1930. In some examples, after free space move minimization, the graph is re-pruned in order to get rid of any new dead-end branches. This optional optimization step eliminates the need to refine runway crossings that are not necessary.

Figure 20A:
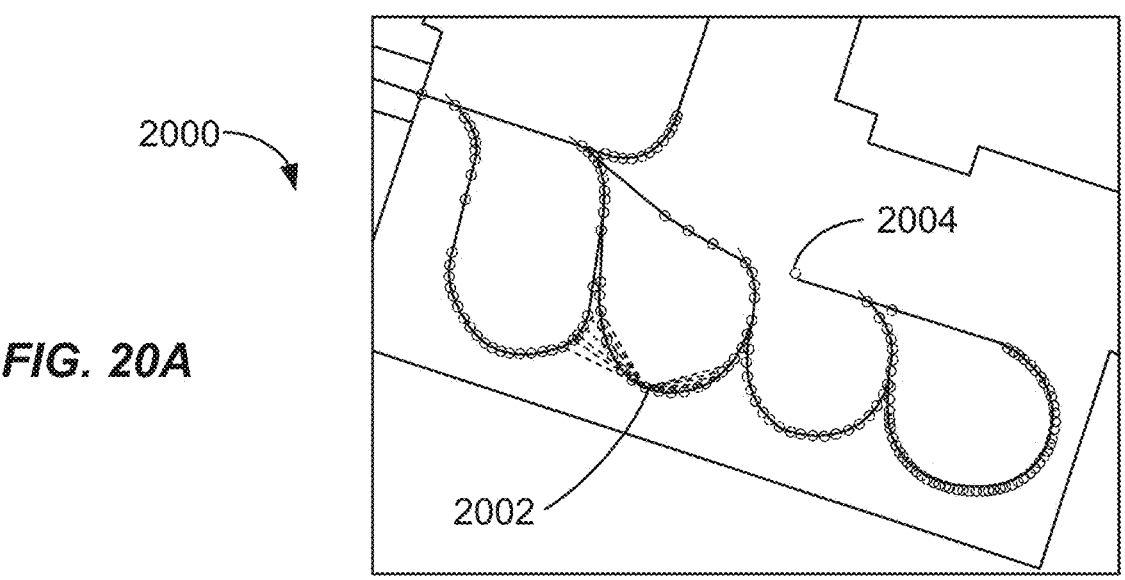
FIGS. 20A-20C show examples of pruning and minimization of goal pose edges in a route graph, in accordance with examples of the present disclosure.
Figure 20B:
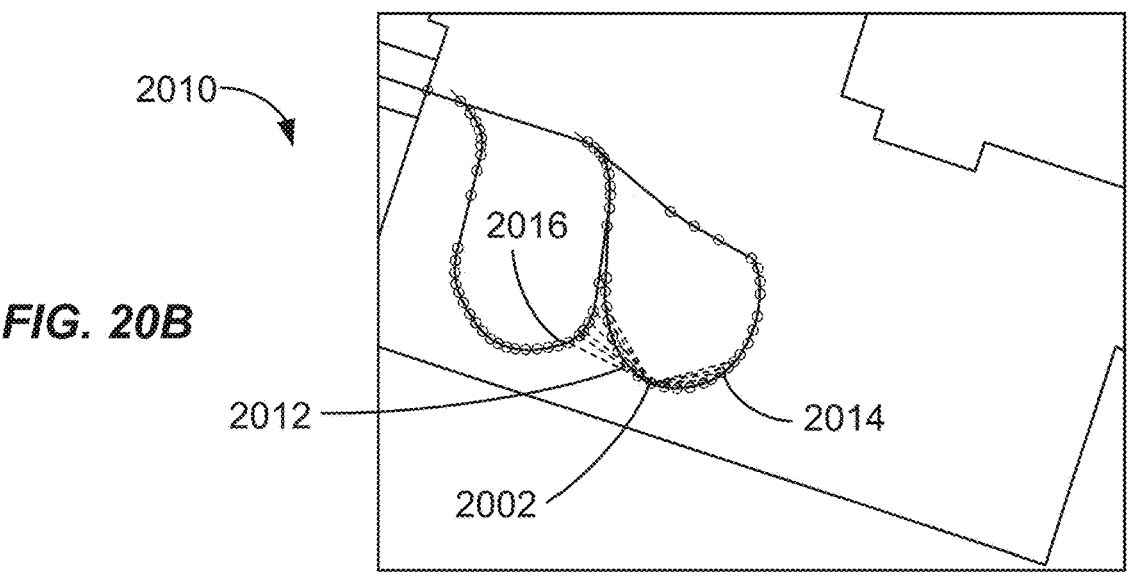
Figure 20C:
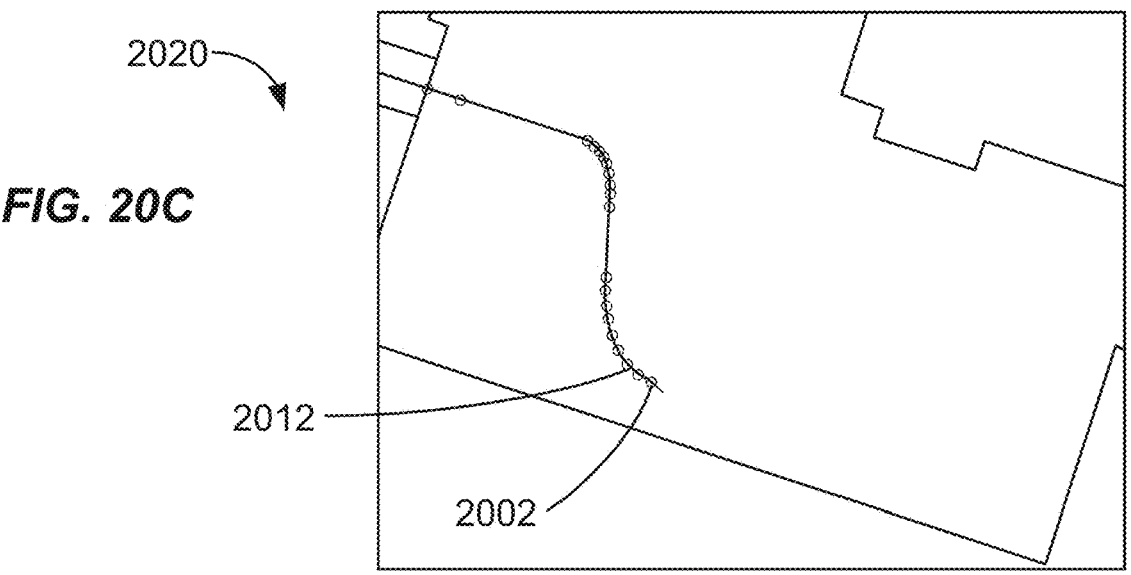

FIGS. 20A-20C show examples of pruning and minimization of goal pose edges in a route graph, in accordance with examples of the present disclosure. In FIG. 20A, a complete graph 2000 shows multiple putative moves from different vertices to destination pose 2002. Complete graph 2000 also includes a sink node 2004, which is connected to destination pose 2002. This is because generation of the complete graph includes connecting goal pose 2002 to K neighbor taxi vertices. FIG. 20B shows a pruned graph 2010 connecting goal pose 2002 to nearby vertices. Pruned graph 2010 still includes putative moves to taxi vertices 2012, 2014, and 2016. However, putative moves to deleted dead-end sink node 2004 have been eliminated. FIG. 20C shows minimized graph 2020 connecting start pose 2002 to taxi vertex 2012. Pruned graph 2010 still retained redundant putative edges, which were eliminated by the free space move minimization module to produce minimized graph 2020. In some examples, due to the minimum turning radius, sometimes the surviving connection to the "nearest" taxi vertex node is not actually the closest node in terms of distance. This occurs because if a node is too close to the goal node, but has a heading that cannot be reached due to the minimum turning radius, then the "refined" move actually connects a node that is further away from the goal node with a bigger free space loop.

Figure 21:
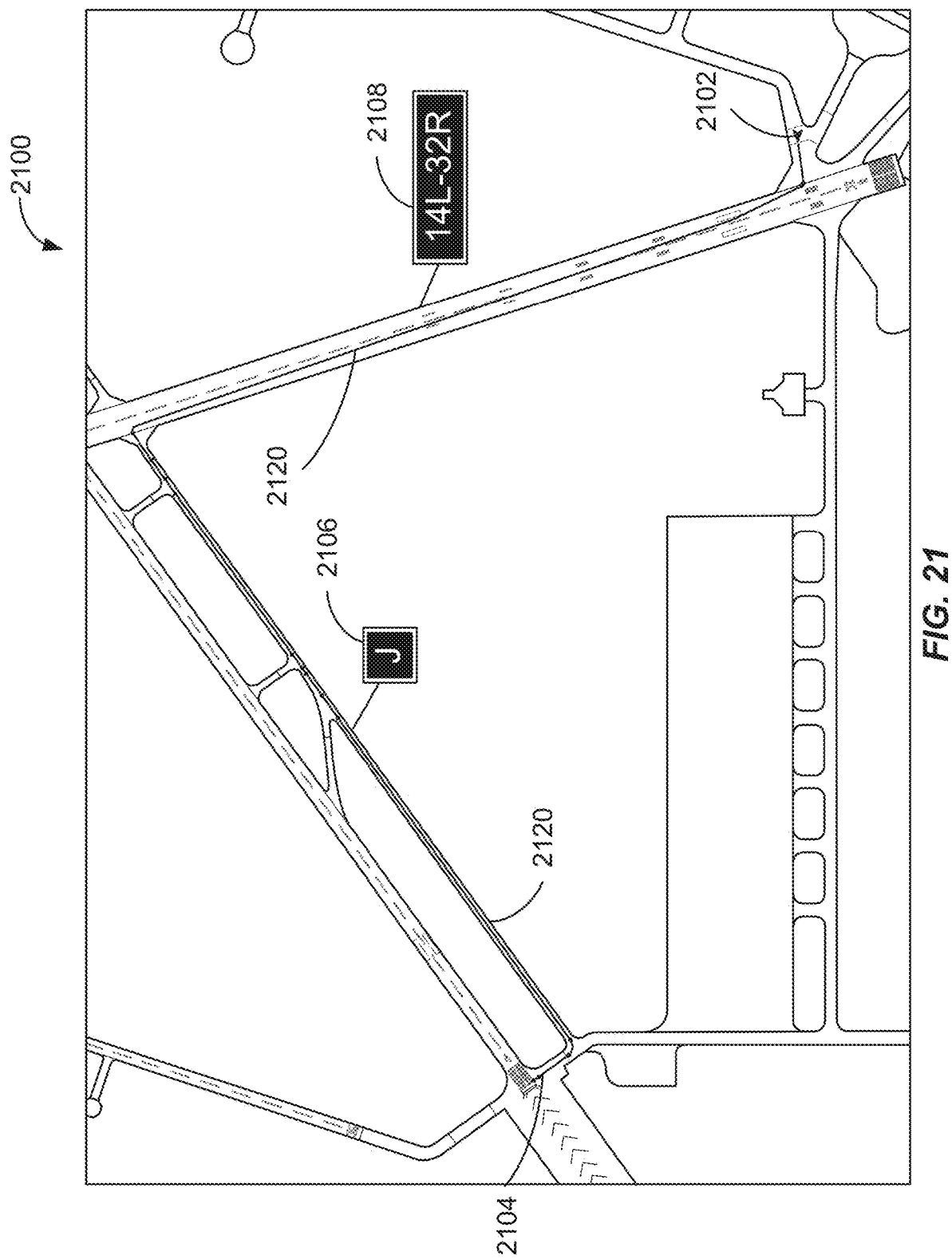
FIG. 21 shows a route generated from a clearance with a runway explicit runway crossing, in accordance with examples of the present disclosure.

The descriptions above have only mentioned implicit runway crossings up until this point. In other words, the clearance commands have only mentioned taxiways as named places on route. However, there can be clearance commands that include explicit runways as named places on route. FIG. 21 shows a map 2100 including route 2120 generated from a clearance with a runway explicit runway crossing, in accordance with examples of the present disclosure. The path generated corresponds to the clearance "Runway 4 taxi 32R Juliet." The aircraft is currently at start pose 2102. Runway 4 is the destination runway, and hence the destination pose is threshold entry node 2104, off of taxiway 2106, named "J." Instead of another taxiway, the clearance explicitly names runway 32R, shown in FIG. 21 as runway 2108. It should be noted that since the aircraft will be taxiing down runway 2108, the entire stretch of route 2120 is initially generated as a putative move and not refined until later processing steps, as needed.

Figure 22A:
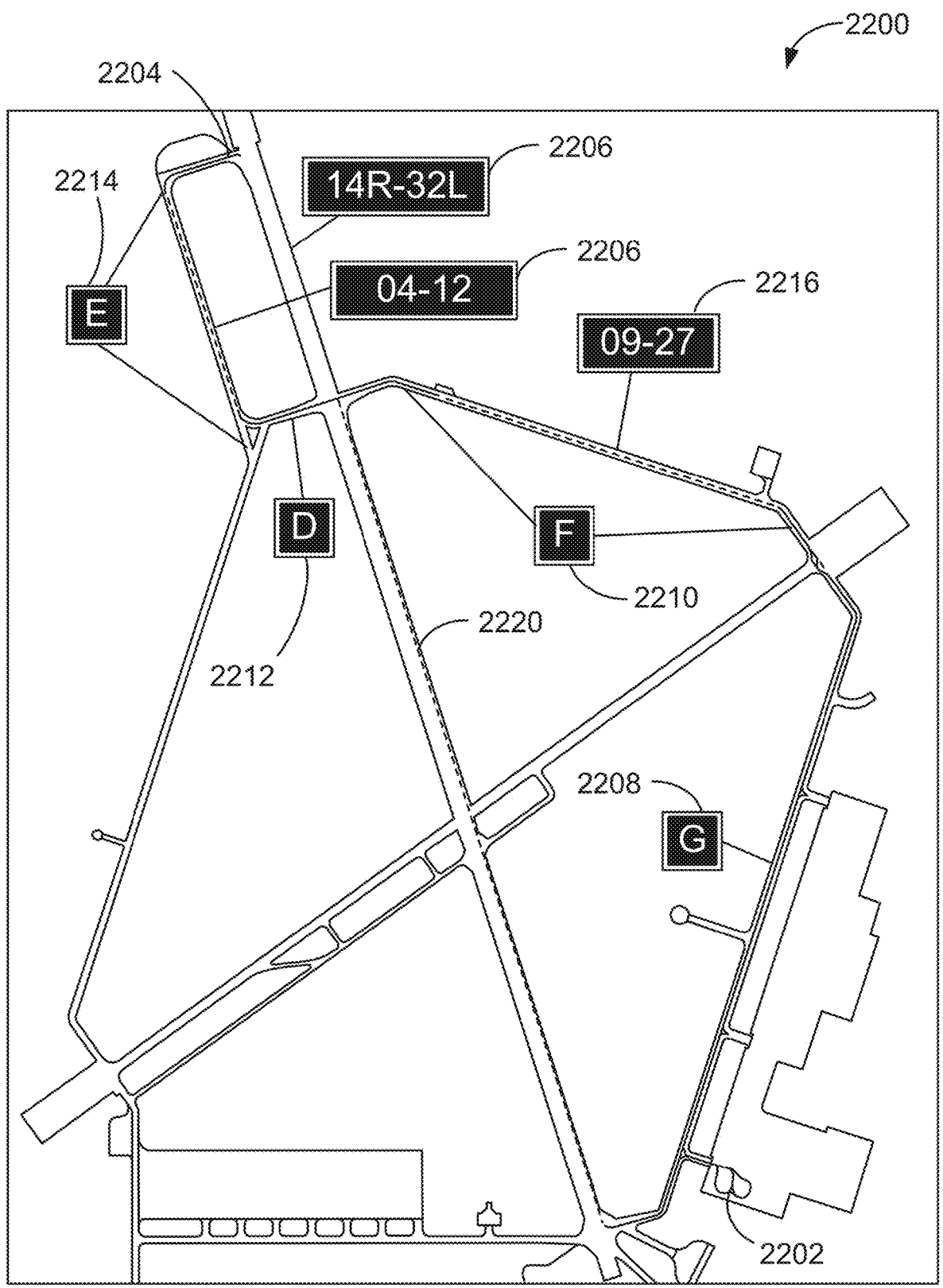
FIGS. 22A and 22B show examples of unrefined and refined route graphs generated from a clearance with multiple implicit runway crossings, in accordance with examples of the present disclosure.
Figure 22B:
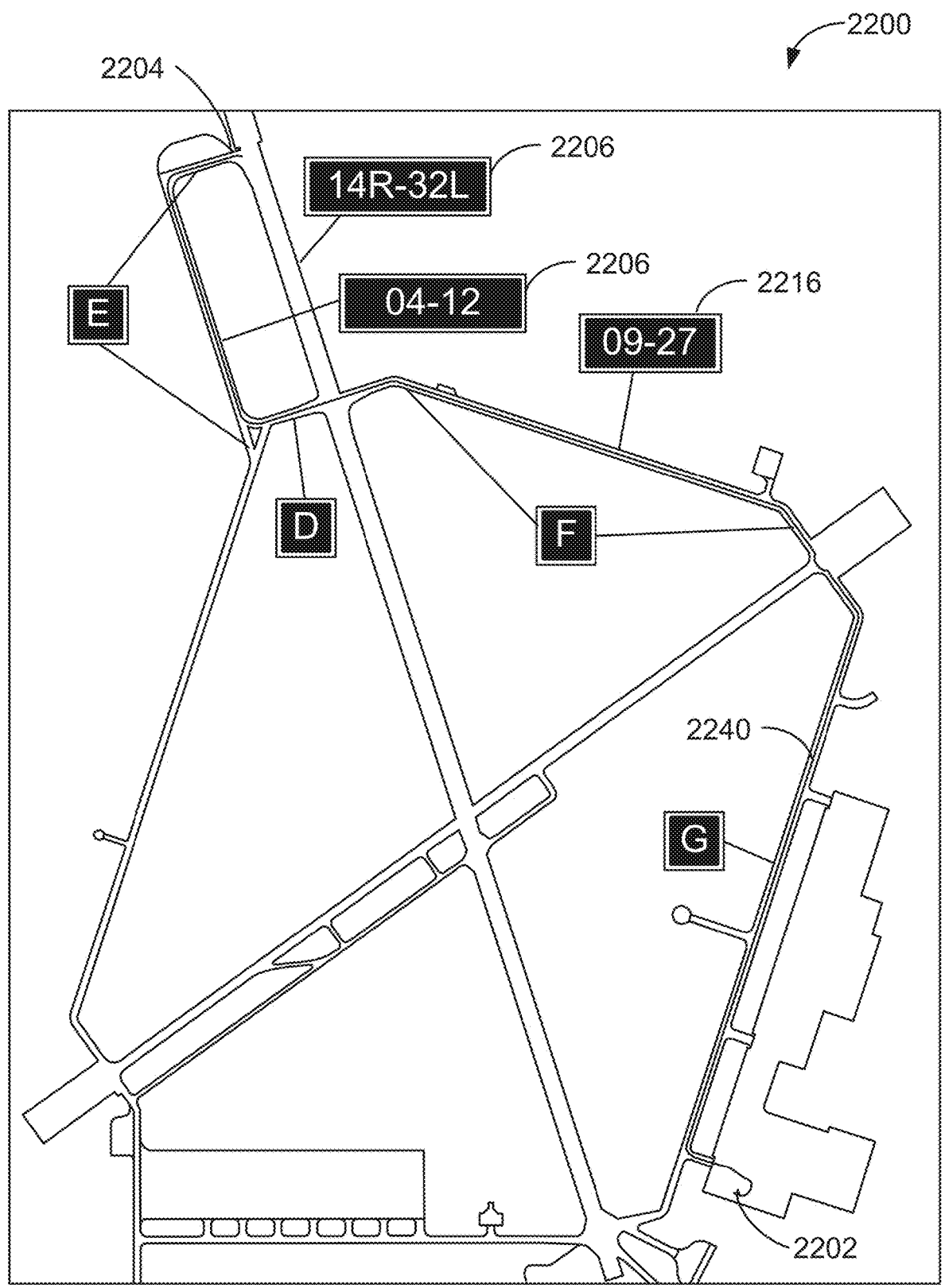

FIG. 21 illustrates an example of a route generated from a clearance with an explicit runway crossing. By contrast some clearances contained multiple implicit runway crossings. In some examples, this includes crossing runways that are continuous with taxiways. FIGS. 22A and 22B show examples of unrefined and refined route graphs generated from a clearance with multiple implicit runway crossings, in accordance with examples of the present disclosure. Map 2200 includes a complete graph 2220 from start pose 2202 to threshold entry node 2204 belonging to runway 2206. Complete graph 2220 shows paths through taxiway 2208 (named "G"), taxiway 2210 (named "F"), taxiway 2212 (named "D"), taxiway 2214 (named "E"), and even through runway 2206 (coming from 32L). It is worth noting that taxiway 2210 is interrupted by runway 2216 (named "09-27") continuous with taxiway 2210. Taxiway 2210 even straddles both ends of runway 2216. The edge of complete graph 2220 through runway 2216 is considered a putative move initially. The same applies to runway 2218 (named "04-12") runway straddled by taxiway 2214 on both sides. FIG. 22B shows map 2200 with pruned and minimized graph 2240, connecting start pose 2202 to threshold entry node 2204. Note that the putative edges along runway 2218 and 2216 have been refined. In addition, the putative edge of complete graph 2220 running along runway 2206 has been deleted.

Figure 23:
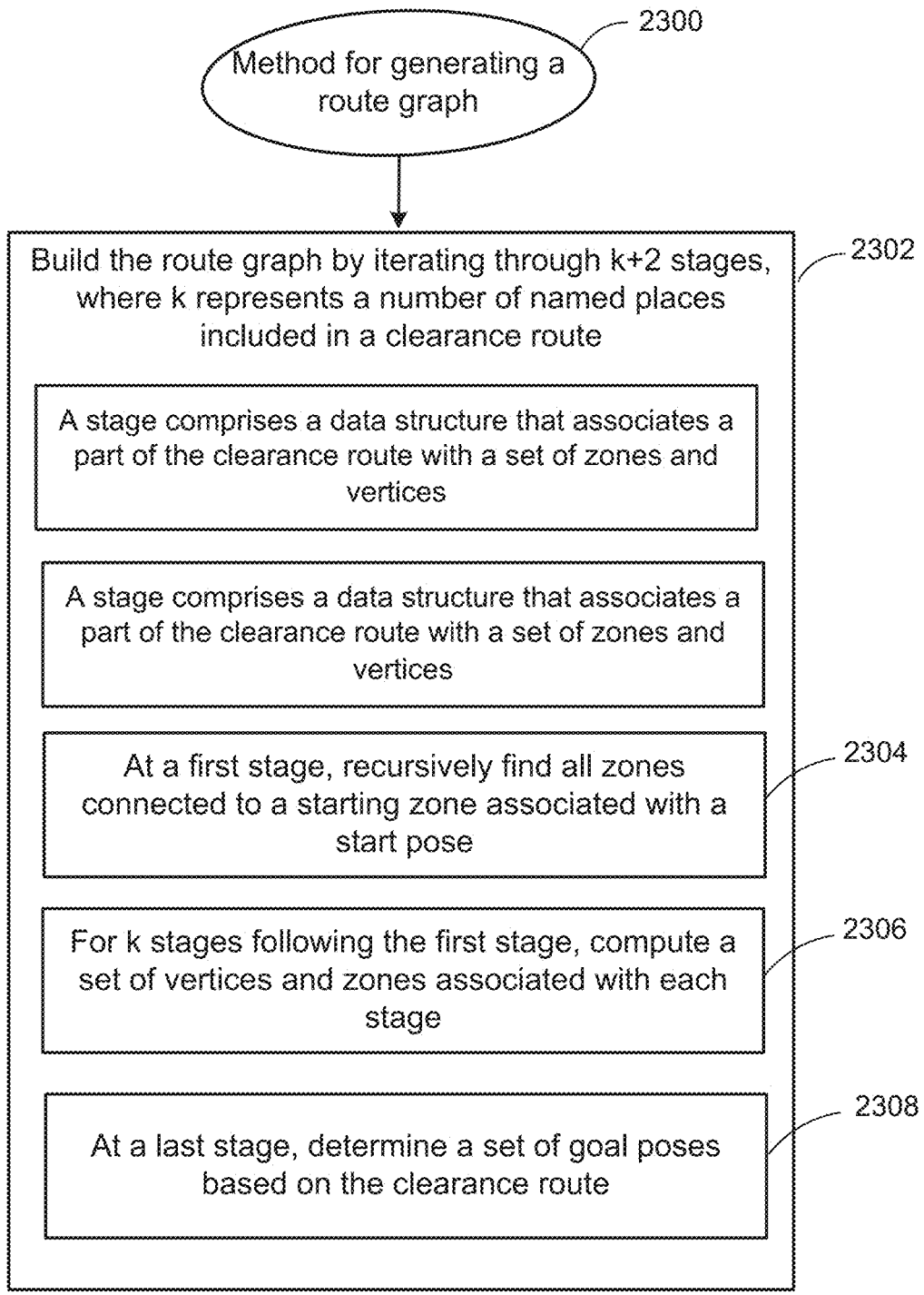
FIG. 23 shows a flowchart of a method for executing a planned taxi route, in accordance with examples of the present disclosure.

FIG. 23 shows a flowchart of a method 2300 for generating a route graph, in accordance with examples of the present disclosure. Method 2300 can be executed by a processor and memory. Method 2300 includes building (2302) the route graph by iterating through k+2 stages, where k represents a number of named places included in a clearance route. In some examples, a stage comprises a data structure that associates a part of the clearance route with a set of zones and vertices, similar to the data structures in FIG. 11. In some examples, iterating through k+2 stages includes steps 2304-2308. At 2304, iterating through k+2 stages begins at a first stage, where all zones connected to a starting zone associated with a start pose is recursively found. Then, at step 2306, for each of k stages following the first stage, a set of vertices and zones associated with each stage is also computed. Last, at step 2308, a set of goal poses is determined based on the clearance route for the last stage. In some examples, steps 2302-2308 are similar to the steps involved in generating a breadth first search graph using stages, as described FIGS. 10 and 11.

Figure 24:
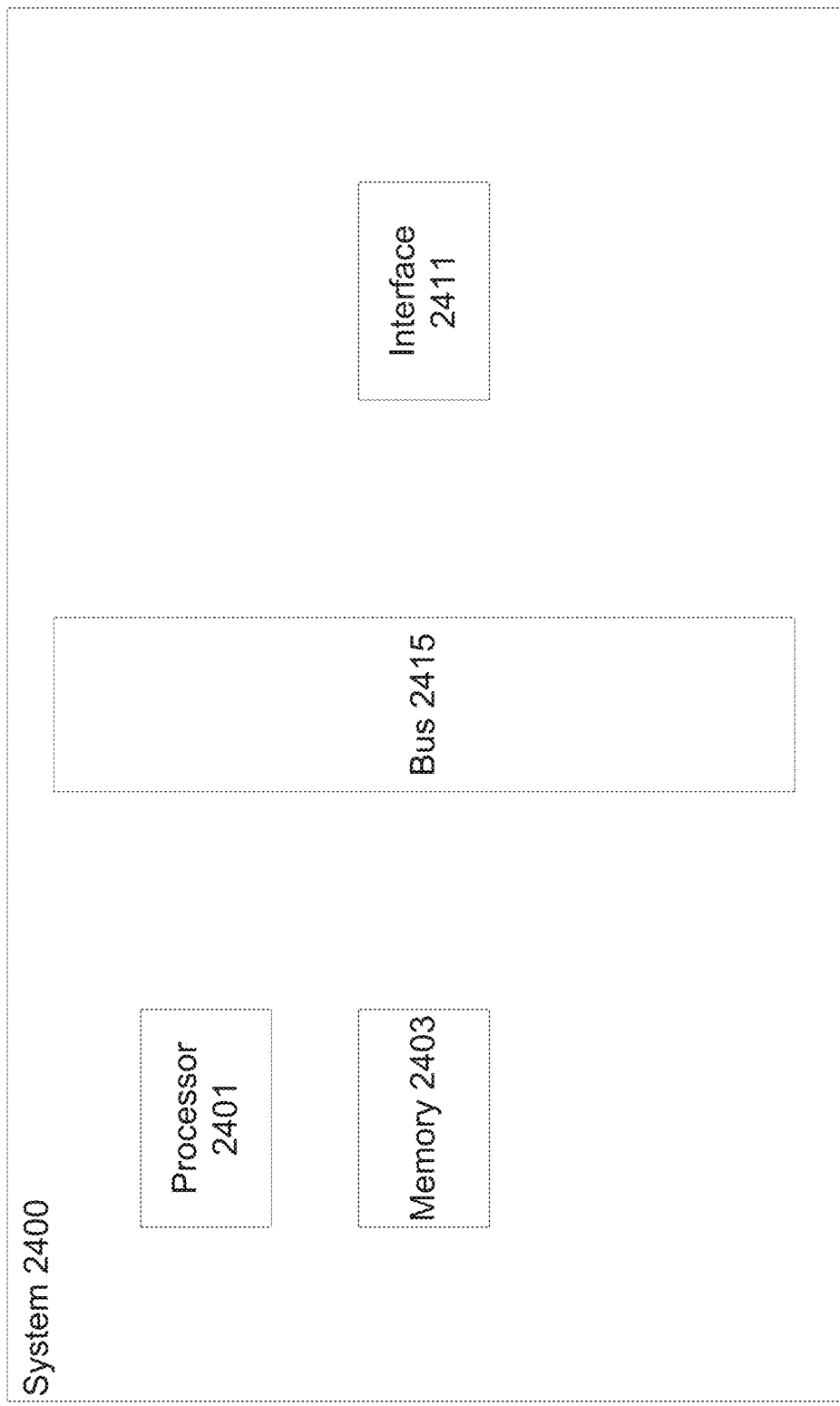
FIG. 24 illustrates a block diagram of an example of a system capable of implementing various processes described herein, in accordance with one or more examples of the present disclosure.

FIG. 24 is a block diagram illustrating an example of a system 2400 capable of implementing various processes described in the present disclosure. According to particular examples, a system 2400, suitable for implementing particular examples of the present disclosure, includes a processor 2401, a memory 2403, an interface 2411, and a bus 2415 (e.g., a Peripheral Component Interconnect (PCI) bus or other interconnection fabric) and operates as a streaming server. In some examples, when acting under the control of appropriate software or firmware, the processor 2401 is responsible for the various steps described in any method described herein. Various specially configured devices can also be used in place of a processor 2401 or in addition to processor 2401.

The interface 2411 is typically configured to send and receive data packets or data segments over a network. Particular examples of interfaces supports include Ethernet interfaces, frame relay interfaces, cable interfaces, Digital Subscriber Line (DSL) interfaces, token ring interfaces, and the like. In addition, various very high-speed interfaces may be provided such as fast Ethernet interfaces, Gigabit Ethernet interfaces, Asynchronous Transfer Mode (ATM) interfaces, High Speed Serial (HSS) interfaces, Point of Sale (POS) interfaces, Fiber Distributed Data (FDD) interfaces and the like. Generally, these interfaces may include ports appropriate for communication with the appropriate media. In some cases, they may also include an independent processor and, in some instances, volatile Random Access Memory (RAM). The independent processors may control such communications intensive tasks as packet switching, media control and management.

According to particular example examples, the system 2400 uses memory 2403 to store data and program instructions for operations. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs).

Examples of program instructions include both machine code, such as produced by a compiler, and files containing higher level code that may be executed by the computer using an interpreter.

Examples of Aircraft and Methods of Fabricating and Operating Aircraft

Figure 25:
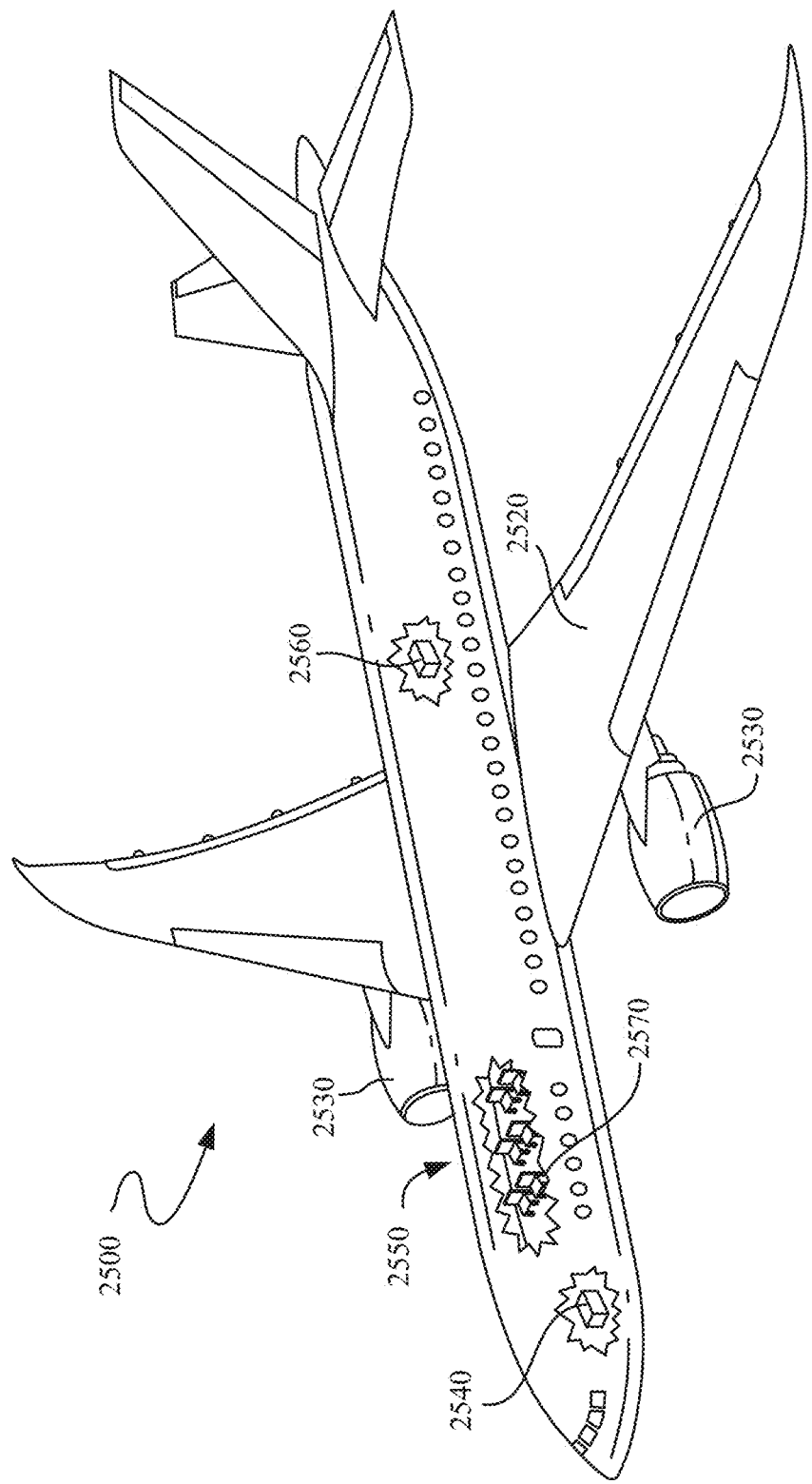
FIG. 25 illustrates a schematic illustration of an aircraft, in accordance with one or more examples of the present disclosure.

To better understand various aspects of implementation of the described systems and techniques, a brief description of an aircraft and aircraft wing is now presented. FIG. 25 is a schematic illustration of aircraft 2500, in accordance with some examples. As depicted in FIG. 25, aircraft 2500 is defined by a longitudinal axis (X-axis), a lateral axis (Y-axis), and a vertical axis (Z-axis). In various examples, aircraft 2500 comprises airframe 2550 with interior 2570. Aircraft 2500 includes wings 2520 coupled to airframe 2550. Aircraft 2500 may also include engines 2530 supported by wings 2520. In some examples, aircraft 2500 further includes a number of high-level inspection systems such as electrical inspection system 2540 and environmental inspection system 2560. In other examples, any number of other inspection systems may be included.

Aircraft 2500 shown in FIG. 25 is one example of a vehicle of which components may be utilized with the disclosed systems and/or devices, in accordance with illustrative examples. Although an aerospace example is shown, the principles disclosed herein may be applied to other industries, such as the automotive industry. Accordingly, in addition to aircraft 2500, the principles disclosed herein may apply to other vehicles, e.g., land vehicles, marine vehicles, space vehicles, etc.

Figure 26:
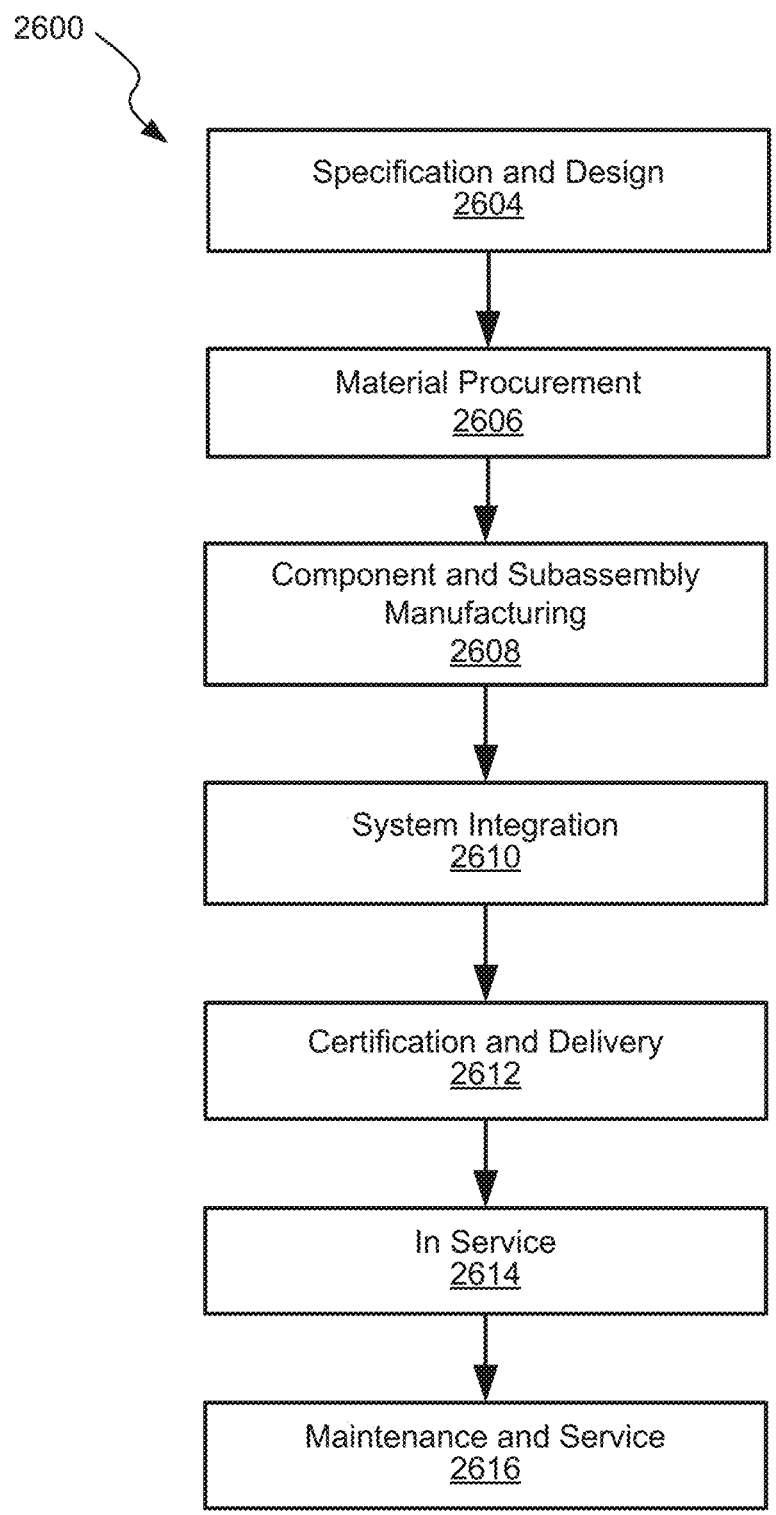
FIG. 26 illustrates an aircraft manufacturing and service method for the aircraft shown in FIG. 25.

Examples of the present disclosure may be described in the context of aircraft manufacturing and service method 2600 as shown in FIG. 26 and aircraft 2500 as shown in FIG. 25. During pre-production, illustrative method 2600 may include specification and design (block 2604) of aircraft 2500 and material procurement (block 2606). During production, component and subassembly manufacturing (block 2608) and inspection system integration (block 2610) of aircraft 2500 may take place. Described methods, and assemblies formed by these methods, can be used in any of specification and design (block 2604) of aircraft 2500, material procurement (block 2606), component and subassembly manufacturing (block 2608), and/or inspection system integration (block 2610) of aircraft 2500.

Thereafter, aircraft 2500 may go through certification and delivery (block 2612) to be placed in service (block 2614).

While in service, aircraft 2500 may be scheduled for routine maintenance and service (block 2616). Routine maintenance and service may include modification, reconfiguration, refurbishment, etc. of one or more inspection systems of aircraft 2500. Described methods, and assemblies formed by these methods, can be used in any of certification and delivery (block 2612), service (block 2614), and/or routine maintenance and service (block 2616).

Each of the processes of illustrative method 2600 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 2600). For example, components or subassemblies corresponding to component and subassembly manufacturing (block 2608) may be fabricated or manufactured in a manner similar to components or subassemblies produced while aircraft 2500 is in service (block 2614). Also, one or more examples of the apparatus(es), method(s), or combination thereof may be utilized during production stages (block 2608) and (block 2610), for example, by substantially expediting assembly of or reducing the cost of aircraft 2500. Similarly, one or more examples of the apparatus or method realizations, or a combination thereof, may be utilized, for example and without limitation, while aircraft 2500 is in service (block 2614) and/or during maintenance and service (block 2616).

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific examples thereof, it will be understood by those skilled in the art that changes in the form and details of the disclosed examples may be made without departing from the spirit or scope of the disclosure. It is therefore intended that the disclosure be interpreted to include all variations and equivalents that fall within the true spirit and scope of the present disclosure.

Clause 1: A system for autonomous taxi route planning for an aircraft comprising a processor; and a memory, the memory storing instructions, when executed by the processor, cause the processor to receive a route planning problem, and autonomously generate an executable taxi route corresponding to the planning problem based on pre-determined criteria.

Clause 2: The system of Clause 1, wherein the route planning problem is generated from a clearance command.

Clause 3: The system of Clause 2, wherein the clearance command includes a destination, a sequence of named places, and optionally, one or more holds at named intersections.

Clause 4: The system of Clause 3, wherein generating the executable taxi route includes grounding references included in the clearance command to generate a grounded clearance, generating a route graph by searching a set of all feasible routes based on the grounded clearance between a start pose and the destination included in the clearance command, pruning the route graph by minimizing free space moves, extracting a shortest path to generate the executable taxi route.

Clause 5: The system of Clause 4, wherein generating the route graph includes inserting speculative free space moves to connect a start pose and a goal pose or to a taxi network.

Clause 6: The system of Clause 5, wherein the free space moves are generated using a closed form solution involving only six combinations of straight line and left and right turn movements.

Clause 7: The system of Clause 6, wherein turn movements include a center of rotation defined by an intersection between an axis of non-steerable wheels and an axis of a steerable wheel.

Clause 8: The system of any of Clauses 4-7, wherein grounding references includes generating a set of candidate goal poses for the destination.

Clause 9: The system of any of Clauses 4-8, wherein grounding references includes generating a sequence of traversable zones for the sequence of named places.

Clause 10: The system of any of Clauses 4-9, wherein the route planning problem includes one or more of the following inputs: a start pose, an abstract destination, an abstract route definition, an airport map, and aircraft kinematic model, and an aircraft footprint.

Clause 11: The system of Clause 10, wherein the airport map is partitioned into zones, the zones being one of three types: taxiway, runway, and non-movement.

Clause 12: The system of Clause 11, wherein the airport map includes a taxiway network, the taxiway network including regulation centerlines/guidelines.

Clause 13: The system of Clause 12, wherein the taxiway network is a graph of centerlines/guidelines and vertices, wherein each vertex represents an entry point into a zone.

Clause 14: The system of Clause 13, wherein the route graph includes nodes built on top of taxi vertices and poses, edges representing valid movements between states along taxi edges and free space moves, and breadth-first graph expansion.

Clause 15: The system of any of Clauses 10-14, wherein the route graph includes nodes built on top of taxi vertices and poses, edges representing valid movements between states along taxi edges and free space moves, and breadth-first graph expansion.

Clause 16: The system of any of Clauses 3-15, wherein generating the executable taxi route occurs in k+2 stages, wherein k represents the number of places named in the sequence of named places included in the clearance command.

Clause 17: The system of any of Clauses 1-16, wherein the executable taxi route includes one or more of the following criteria: a path that a drive-by-wire system can follow accurately, a path that keeps the plane on pavement, and a path that is free of collision with known obstacles.

Clause 18: The system of any of Clauses 1-17, wherein the aircraft is an unmanned aircraft.

Clause 19: A system comprising a clearance manager configured to generate a planning problem based on a clearance communication, a route planner configured to generate a planned taxi route from the planning problem, the route planner comprising a grounding reference module configured to generate a grounded clearance from the planning problem, a route graph generation module configured to generate a route graph by searching a set of all feasible routes based on the grounded clearance, a route graph pruning module configured to prune the route graph by minimizing free space moves, a shortest path extraction module configured to generate the executable taxi route by extracting a shortest path from the pruned route graph.

Clause 20: A method for generating a route graph, building the route graph by iterating through k+2 stages, wherein a stage comprises a data structure that associates a part of a clearance route with a set of zones and vertices, wherein k represents a number of named places included in the clearance route, wherein iterating through the k+2 stages includes, at a first stage, recursively finding all zones connected to a starting zone associated with a start pose, for k stages following the first stage, computing a set of vertices and zones associated with each stage, and at a last stage, determining a set of goal poses based on the clearance route.

What is claimed is:

1. A system for autonomous taxi route planning for an aircraft, the system comprising:
   a processor; and
   memory, the memory storing instructions, when executed by the processor, cause the processor to:
      receive a route planning problem, generated from a clearance command received at the aircraft from a ground control station and comprising a sequence of named places, which include one or more taxiways, to a named destination on an airport ground, wherein each taxiway has a guideline; and
      autonomously generate an executable taxi route corresponding to the planning problem by:
         iterating through a plurality of stages, wherein the stages comprise one or more data structures that associate a start pose of the aircraft and each of the sequence of named places with a set of zones and a plurality of vertices and associates the named destination with one or more goal poses, wherein at least one of the named places is a taxiway that has a plurality of associated zones, and
         selecting the executable taxi route through the associated zones of the taxiways that minimizes free space moves, wherein the free space moves are not along any guidelines of the taxiways.

2. The system of claim 1, wherein the sequence of named places include one or more holds at named intersections.

3. The system of claim 1, wherein generating the executable taxi route includes:
   generating grounding references for the sequence of named places and the named destination included in the clearance command to generate a grounded clearance;
   generating a route graph by searching a set of all feasible routes between a set of the vertices and associated zones of the stages based on the grounded clearance between the start pose of the aircraft and the named destination included in the clearance command;
   pruning the route graph by minimizing free space moves that are not along guidelines of any taxiways; and
   extracting a shortest path to generate the executable taxi route.

4. The system of claim 1, wherein generating the route graph includes inserting speculative free space moves to connect the start pose and each of the one or more goal poses or to a taxi network.

5. The system of claim 4, wherein the free space moves are generated using a closed form solution involving only six combinations of straight line and left and right turn movements.

6. The system of claim 5, wherein the turn movements include a center of rotation defined by an intersection between an axis of non-steerable wheels and an axis of a steerable wheel of the aircraft.

7. The system of claim 1, wherein a plurality of goal poses are determined as candidate poses for the named destination.

8. The system of claim 1, wherein a sequence of traversable zones are found for the sequence of named places.

9. The system of claim 1, wherein the route planning problem includes one or more of the following inputs: an airport map, an aircraft kinematic model, and an aircraft footprint.

10. The system of claim 9, wherein the airport map is partitioned into zones, the zones being one of three types: taxiway, runway, and non-movement.

11. The system of claim 10, wherein the airport map includes a taxiway network, the taxiway network including a plurality of guidelines.

12. The system of claim 11, wherein the taxiway network is a graph of guidelines and vertices, wherein each vertex represents an entry point into a zone.

13. The system of claim 12, wherein the route graph includes nodes built on top of taxi vertices and poses, edges representing valid movements between states along taxi edges and free space moves, and breadth-first graph expansion.

14. The system of claim 9, wherein the aircraft footprint includes an undercarriage constraint and an aircraft constraint.

15. The system of claim 1, wherein generating the executable taxi route occurs in k+2 stages, wherein k represents the number of places named in the sequence of named places included in the clearance command.

16. The system of claim 1, wherein the executable taxi route includes one or more of the following criteria: a path that a drive-by-wire system can follow accurately, a path that keeps the plane on pavement, and a path that is free of collision with known obstacles.

17. The system of claim 1, wherein the aircraft is an unmanned aircraft.

18. A system for autonomous taxi route planning for an aircraft, the system comprising:
   a clearance manager configured to generate a planning problem based on a clearance command received at the aircraft from a ground control station and comprising a sequence of named places, which include one or more taxiways, to a named destination on an airport ground, wherein each taxiway has a guideline; and
   a route planner configured to generate a planned taxi route from the planning problem by performing the following operations:
      iterating through a plurality of stages, wherein the stages comprise one or more data structures that associate a start pose of the aircraft and each of the sequence of named places with a set of zones and a plurality of vertices and associates the named destination with one or more goal poses, wherein at least one of the named places is a taxiway that has a plurality of associated zones, and
      selecting the planned taxi route through the associated zones of the taxiways that minimizes free space moves, wherein the free space moves are not along any guidelines of the taxiways.

19. A method for generating a route graph for autonomous taxi route planning for an aircraft, the method comprising:
   receiving a clearance command the aircraft from a ground control station, the clearance command comprising a sequence of named places, which include one or more taxiways, to a named destination on an airport ground, wherein each taxiway has a guideline;
   building the route graph by:

iterating through a plurality of stages, wherein the stages comprise one or more data structures that associate a start pose of the aircraft and each of the sequence of named places with a set of zones and a plurality of vertices and associates the named destination with one or more goal poses, wherein at least one of the named places is a taxiway that has a plurality of associated zones, and selecting the route graph through the associated zones of the taxiways that minimizes free space moves, wherein the free space moves are not along any guidelines of the taxiways.

20. The system of claim 1, wherein the route graph is built based on the clearance command by iterating through k+2 stages, wherein k represents a number of the sequence of named places included in the clearance route, wherein iterating through the k+2 stages includes:

at a first stage, recursively finding all zones connected to a starting zone associated with the start pose;

for k stages following the first stage, computing a set of vertices and zones associated with each stage; and at a last stage, determining a set of goal poses based on the clearance route.

\* \* \* \* \*